United States Patent
Sim

(10) Patent No.: US 10,920,977 B2
(45) Date of Patent: Feb. 16, 2021

(54) SYSTEM AND METHOD FOR DIAGNOSING AND CONTROLLING INCINERATION FACILITY AND SOLID FUEL BOILER AND MANAGING LIFE CYCLE OF FACILITY THROUGH HEAT EXCHANGE AND DESIGN PROGRAM AND OPERATION MODE ANALYSIS OF OPERATOR

(71) Applicant: NEC POWER CO., LTD., Chuncheon-si (KR)

(72) Inventor: Jae-Yong Sim, Incheon (KR)

(73) Assignee: NEC POWER CO., LTD., Chuncheon-si (KR)

( * ) Notice: Subject to any disclaimer, the term of this patent is extended or adjusted under 35 U.S.C. 154(b) by 0 days.

(21) Appl. No.: 16/278,089

(22) Filed: Feb. 16, 2019

(65) Prior Publication Data
US 2019/0242572 A1    Aug. 8, 2019

Related U.S. Application Data

(62) Division of application No. 14/901,709, filed as application No. PCT/KR2014/005764 on Jun. 27, 2014, now abandoned.

(30) Foreign Application Priority Data

Jun. 28, 2013    (KR) .................. 10-2013-0075629

(51) Int. Cl.
*F22B 35/18*    (2006.01)
*F23G 5/50*    (2006.01)
(Continued)

(52) U.S. Cl.
CPC .............. *F22B 35/18* (2013.01); *F22B 37/42* (2013.01); *F23G 5/50* (2013.01); *G05B 13/0245* (2013.01);
(Continued)

(58) Field of Classification Search
None
See application file for complete search history.

(56) References Cited

U.S. PATENT DOCUMENTS 4,852,504 A  *  8/1989  Barresi .................. F23G 5/006
                                                              110/346
8,652,752 B2     2/2014  Hayoz et al.

FOREIGN PATENT DOCUMENTS

JP    2005-090774 A    4/2005
KR    10-2010-0068299 A    6/2010
(Continued)

OTHER PUBLICATIONS

English Machine Translation of KR10-2012-0007658 (Year: 2012).*
(Continued)

*Primary Examiner* — Matthew D Krcha
(74) *Attorney, Agent, or Firm* — Maschoff Brennan

(57) ABSTRACT

A system and method enable an incineration facility to be controlled and diagnosed, and the life cycle thereof managed, using a heat exchange and design program and operation mode analysis of an operator of the facility. Operation efficiency is improved by comparing and analyzing (a) initial design values of the incineration facility, (b) measured actual valued obtained by measuring waste composition and heating values changed after construction of the facility and (c) operation values indicating actual operation adjustment values and operating result values operated by the operator and by analyzing the operator. The design values, measured actual values and operation values are compared and provided as data in graphs and tables.

6 Claims, 23 Drawing Sheets

(51) Int. Cl.
  *G05B 13/02* (2006.01)
  *F22B 37/42* (2006.01)
  *G05B 19/12* (2006.01)
  *F22B 37/38* (2006.01)

(52) U.S. Cl.
  CPC ............ *G05B 19/124* (2013.01); *F22B 37/38* (2013.01); *F23G 2206/203* (2013.01); *F23G 2207/101* (2013.01); *F23G 2207/20* (2013.01); *F23G 2207/30* (2013.01); *Y02E 20/12* (2013.01)

(56) References Cited

FOREIGN PATENT DOCUMENTS

| | | |
|---|---|---|
| KR | 10-0997250 B1 | 11/2010 |
| KR | 10-2012-0007658 A | 1/2012 |
| KR | 10-2012-0105626 A | 9/2012 |

OTHER PUBLICATIONS

English Machine Translation of KR10-0997250 (Year: 2010).*
KR Decision of Grant dated Dec. 26, 2014 as received in Application No. 10-2013-0075629.
KR Office Action dated Oct. 23, 2014 as received in Application No. 10-2013-0075629.

* cited by examiner

Fig. 16

| 1 | Facility history card (facility history current status) |
|---|---|

| Management number | | Title of facility | | | Induced draft fan | |
|---|---|---|---|---|---|---|
| Names of items | Induced draft fan | Total number | 1 | Title of units | written date year, month, day | month, day, 2012 |
| Managing department | Operation team | Staff in charge | Hong Gil-dong | piece | | Photo of facility |
| Installation date and period | January 31, 2012<br>January 2012 ~ April 2012 | Installation position | 1st F Factory building | | | |
| Delivery (installation) company | Speco Corporation | Address | 544-5 Dogok-dong, Gangnam-gu | Tel | 02-3498-3283 | |
| Manufacturing company | Taejong Corporation | Address | 1051 Jungwang-dong, Sihung city | Tel | | |
| Installation cost | 80,000,000won | | | | | |
| Endurance period (LCC) | 10 years | Part exchange period | bearing | | bearing | |
| | | | | bearing | | |

| 1 | 1-1. Checking record | 2 | 1-2. Facility repair history | 3 | 1-3. Management criteria | 4 | 1-4. Prevention repair and consumable part management | Remarks |
|---|---|---|---|---|---|---|---|---|
| | | | | | Management detail contents | | | |

| 1-2 | Facility error cause analysis and repair construction history management | | | | |
|---|---|---|---|---|---|
| (430) | | | | | |
| | Items | Detailed contents | | | Remarks |
| | Error date | Automatic check program for operation manual recorded in facility history card (431) | Check exceeding range | Check state by checker | MMI data exceeding state | The on-site checking record data recorded in TJ-PLM DB are automatically analyzed, and the section which exceeds the normal section value and the checking state by the checker are automatically searched and checked. |
| | error check and cause analysis | | Normal/exceeding | Checked/not checked | Normal/exceeding | In case of exceeding and non-checked, exceeding section and no-check date are automatically searched and displayed. |
| | Error cause classification | 1. Design cause | | | | The basis cause for error is categorized into three kinds which are used as feedback materials. |
| | | 2. Construction cause | | | | |
| | | 3. Operation cause | | | | (432) |
| | Measure contents | | | | | |
| Facility repair contents | Repair cost | | | | | |
| | VE/LCC evaluation program (value and unit cost analysis) | 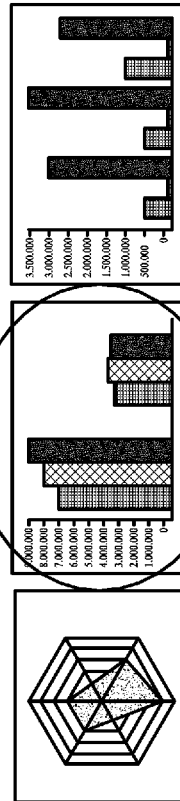 | | | | Plant life cycle management and unit cost management (433) |

Fig. 19

| 1-3 | Facility history card (facility history current status) |

The function wherein checked date and exchange date are automatically transmitted to the cellular phone of the on-site checker for checking. (440)

| Items | | Consumable part management content | Exchange cycle (design criteria) content | Actual exchange date content | Exchange contents | |
|---|---|---|---|---|---|---|
| Consumable part management content | Consumable part exchange cycle and exchange contents | 1. Lubricant | | | | Automatic alarm function |
| | | 2. Grease | | | | Automatic alarm function |
| | | 3. Bearing [NFC] | | | | Automatic alarm function |
| | | 4. Shaft | | | | Automatic alarm function |
| | | 5. | | | | |
| | Prevention and repair contents | 1. 55 | | | | |
| | | 2. Air blower blade cleaning | | | | |
| | | 3. | | | | |
| | | 4. | | | | |
| | | 5. | | | | |

(441) Automatic management system is constructed by attaching electronic tag (NFC) to consumable parts and materials (442)

SYSTEM AND METHOD FOR DIAGNOSING AND CONTROLLING INCINERATION FACILITY AND SOLID FUEL BOILER AND MANAGING LIFE CYCLE OF FACILITY THROUGH HEAT EXCHANGE AND DESIGN PROGRAM AND OPERATION MODE ANALYSIS OF OPERATOR

TECHNICAL FIELD

The present invention relates to a system and method for diagnosing and controlling an incineration facility and solid fuel boiler and managing the life cycle of a facility through a heat exchange and a design program and an operation mode analysis of an operator, and in particular to a data integrated management system wherein based on various data [in the course of the incineration facility, the input amount of wastes, an input cycle, the moving speed of a fire grate (a drying zone, a combustion zone and a post-combustion zone), the rotation speed of a rotary Kilin, the moving speed of a fluidized-bed sand, the primary amount of combustion air, the amount of secondary combustion air, and an incineration facility outlet temperature, the amount of exhaust gas, the amount of steam generation, the pressure of primary and secondary amount of combustion airs, SOx, NOx, HCl, $O_2$, CO, etc. which correspond to the output values of a result of the operation of the incineration facility] [the above values are stored in a form of one minute data (DB)] which correspond to the operation values of an operator which are automatically stored on a MMI (Man Machine Interface) which is a control program for an incineration facility and a solid fuel boiler, a driving type of an operator and an exceeding or decreasing section with respect to a driving manual value, etc. are automatically analyzed, and with the aid of a heat balance program, a combustion efficiency, etc. can be automatically analyzed in real time based on measured actual values obtained by measuring an incineration facility initial design criteria value and a waste composition and a heating value which will change after the installation of an incineration facility and an operation value by an incineration facility operator. In addition, the present invention is directed to a system which allows to automatically operate an operation control of an incineration facility and a solid fuel boiler based on the input amount of wastes in such a way that the operator automatically feedbacks an operation adjusting range [in the course of operations of the incineration facility, the input amount of wastes, input cycle, the moving speed of a fire grate (a drying zone, a combustion zone, a post-combustion zone), the rotation speed of a rotary Kilin, the moving speed of a fluidized-bed sand, the primary amount of combustion air, the amount of secondary combustion air, etc.] of an operator since the automatically analyzed data are analyzed in real time, and the data which are analyzed in real time can be feedback even at the time of facility designing and maintenance, whereupon the efficient managements of the incineration facility and the solid fuel boiler are available.

BACKGROUND ART

There is an increasing demand for new and recyclable energy thanks to the depletion of natural resource. The technology development on an environment basic facility (an incineration facility and a solid fuel boiler: hereinafter referred to as "incineration facility") to recycle waste resource into energy resource is being widely carried out.

The technology on a design, construction, operation and diagnosis of the environment basic facility remains currently at a basic level, and an energy recovery ratio is very low, and a facility management is not efficiently carried out.

For this reason, the failure and residual value of the facility are being significantly lowered. In this regard, for the sake of a stable and efficient operation of an environment basic facility (an incineration facility), there is an increasing demand on an integrated management system of a diagnosis evaluation with respect to an initial design criteria, a control and an operation data in such a way to use big data which are generated from a MMI (Man Machine Interface) which is a control program.

When being designed, the incineration facility in general may be determined through a design calculation procedure (Mass & Heat balance) in consideration of three components (moisture, ash, combustible components) of loaded wastes and the heating value and the size and composition of wastes through element analysis (C, H, O, N, S, Cl).

In order to determine the kinds of incineration facilities, grate capacity (an area where wastes are combusted), and the volume and type of a combustion chamber, it needs to have a grate capacity (100~450 kg/m$^2$·hr), a volume capacity (60,000~250,000 kcal/m$^3$·hr) and an air ratio (1.4~2.3). The range of these design factors may be determined in consideration of the heating value, sizes, composition of wastes. Most of the design factors are determined by an experimental constant value based on the inherent knowhow of a technology corporation. Actually, there in general are conflicts (a criteria lack in accurate operation data analysis) between an ordering company and an installation company since a diagnosis evaluation and verification are not properly carried out on the above design factors after an incineration facility is installed.

Special situations occur, wherein the wastes having composition and heating values which are different from the wastes at the time the incineration facility was designed due to a government policy and various actual situations, whereupon there occurs an operation situation wherein a design deviation condition in general are present in the input wastes and operation conditions which are out of the design range.

For this reason, the temperature in the combustion chamber changes higher or lower than the designed value, so there may be a critical effect on the efficiency of the apparatus with respect to a fire brick, a fire grate and a backside facility of a prevention facility. The conventionally existing automatic operation control system (Auto Combustion System) may be an operation system which may operate under conditions where the heating values and composition of wastes are homogenized. To this end, such a system may not operate normally under conditions where heating values and composition of wastes change in various forms. For this reason, the automatic operation systems installed in Korea are not operating normally.

As for the detailed matters with respect to an incineration facility design, a common incineration facility is designed in such a way that a secondary combustion air accounts for 20~40% of the amount of whole supply air so as to combust an incomplete combustion product included in a non-combusted gas in the primary combustion stage of incineration materials, Tar, Char, etc.

The factors which may determine a combustion performance of an incineration facility consist of 3T which are time, temperature and turbulence. For the sake of destruction or inhibition of an incomplete combustion product which generates in the course of combustions of incineration materials, a mixture with air with the aid of strong turbulence may be necessary at over a predetermined temperature; but in case where the amount of air decreases, the flow speed at an end of a secondary combustion air nozzle may become slow, so the destruction of the incomplete combustion product may weak in the incineration facility.

Meanwhile, since a detailed combustion situation in the actual incineration facility is very nonuniform and measurement is almost impossible, a total operation control system is necessary, which is able to manage or recognize the whole combustion situations using a heat balance program and the measurement value of the temperature in the incineration chamber (an outlet temperature of an incineration facility, an upper side temperature in a drying zone, and an upper side temperature in a post-combustion zone) and an oxygen concentration and a combustion gas amount at a rear end of the boiler.

The combustion phenomenon which occurs in the combustion chamber of the incineration facility is very complicated, and the temperatures and the generation amount of the combustion gas components and the non-combusted components contained therein are different. In case of a stoca type, the non-combustion phenomenon may occurs in such a way that combustions mainly take place in the drying zone wherein the temperature is relatively low or in the combustion zone wherein oxygen is not present enough locally. In case of the rotary Kilin type or the rotary Kilin combined type, such phenomenon occurs at the Kilin mouth and the fire grate portion at the rear end, and in case of the fluidized bed type, such phenomenon occurs at the sand layer where fluidization is non-uniform.

The combustion gas which was passed through the incineration material does not have a good mixing effect, so the distribution of temperature and component are maintained almost constant until the combustion gas passes through the primary combustion chamber and inputs into the secondary combustion chamber. When the secondary air is injected, the mixing of the combustion gas may be promoted, and the combustion of the component which is not combusted and the destroying procedure of contaminants can be actively carried out.

As for the evaluation on the combustion gas during the incineration, it is more reliable to evaluate the session after the secondary air supply time rather than evaluating the temperature and duration time with respect to the whole primary and secondary combustion chambers.

As an example of the technology to control the incineration facility, the MMI (Man Machine Interface) program which is the total operation control program is installed in the comprehensive control chamber.

Since the MMI is able to simply store and control, but does not have a function to effectively analyze and control various combustion characteristics of the incineration facility, the operator and manager should analyze again the data accumulated in the MMI. The amount of data (big data) is very huge, so it is actually impossible to analyze the data in real time. More specifically, a simple search function with respect to the operation adjusting value generating when the operator operates and the output value with respect to a result of the operation is available, but the completely automatic operation is actually impossible with respect to the incineration facility thanks to the characteristics wherein the operation conditions change from time to time due to the composition of various wastes.

Therefore, the automatic operation system (Auto Combustion System) which has been conventionally installed, does not remain efficiently operated due to the above problems, whereupon the above automatic operation system is almost useless.

It seems to be more practical to allow the operator to be supported when efficiently operating the incineration facility in such a way to install a program which allows to directly determine the adjusting value, for example, a waste input amount, an input cycle, a waste agitating speed, a primary amount of combustion air, a second combustion air amount, etc. as the operator, for the sake of efficient combustions, comprehensively determine the indexes, for example, the temperature at the mouth of an incineration facility, oxygen concentration inside a furnace, the amount of exhaust gas, the concentration of carbon monoxide, the concentration of nitrogen oxide, etc.

For the sake of efficient operation of the system facility, it is more important to provide objective knowledge (various engineering knowledge, etc. for example, knowledge used for operation, design criteria, operation manual, etc.) which the operator can determine with, but the conventional system does not equip with a function (a performance analysis on an initial design value and an actual operation value) which may allow to analyze in real time the detailed contents on the design of the incineration facility and the generating data.

In particular, since the operation data by the operator are stored and saved in a temporal storage (CD, USB, etc.) at regular cycles, much longer time is necessary for the sake of integrated analysis, for example, a design criteria value, etc. when any analysis on the subsequent error or operation in the incineration facility is necessary, and it needs to develop a separate program for the sake of analysis.

In a part of the incineration facility, an actual situation is like that a systematic management is not being carried out, for example, the data stored in the MMI are lost.

The MMI outputs only simple driving daily at every hour, and the checking on the on-site facility is manually recorded by the operator. To this end, error, missing, etc. are frequently taking place when inputting again into a PC, etc., so there may be a limit to using it as objective and universal data.

The incineration facility is an expensive plant facility and a facility which has 20~40 years of plant life cycle management from the initial design to the destruction through operations. It is the facility wherein the operation by the operator is considered important.

In the real situation, the operator may be any inhibiting factor in terms of an efficient operation of the facility since a design concept on an incineration facility is ambiguous, and professional knowledge lacks, and any chance to take a professional education is losing due to shifts.

DISCLOSURE OF INVENTION

Accordingly, the present invention is made in an effort to resolve the above problems. It is an object of the present invention to provide a system and method for diagnosing and controlling an incineration facility and solid fuel boiler and managing the life cycle of a facility through a heat exchange and a design program and an operation mode analysis of an operator, wherein an operation efficiency can be enhanced in such a way that an initial design value (a) of an incineration system, an measured actual values (b) which is obtained by measuring composition and heating value of wastes which change after the installation of the incineration facility, and an operation value (c) which represents an operation adjusting value obtained as an operator actually operates, and an output value which is a result value of the operation are compared and analyzed, and based on the above data, a heat balance and a design program (Heatbalance) are used, and the operation type of an operator is analyzed.

TECHNICAL SOLUTION

To achieve the above objects, there is provided a system diagnosing and controlling an incineration facility and solid fuel boiler and managing the life cycle of a facility through a heat exchange and a design program and an operation mode analysis of an operator, wherein the system may include a server which provides a database wherein analysis data are compared and analyzed in real time with the operation value of the actual incineration facility and are stored, wherein the analysis data are calculated using a heat balance program (Heatbalance) performed on various data [in the course of the incineration facility, the input amount of wastes, an input cycle, the moving speed of a fire grate (a drying zone, a combustion zone and a post-combustion zone), the rotation speed of a rotary Kilin, the moving speed of a fluidized-bed sand, the primary amount of combustion air, the amount of secondary combustion air, and an incineration facility outlet temperature, the amount of exhaust gas, the pressure of steam generation, the pressure of primary and secondary amount of combustion airs, $SO_x$, $NO_x$, HCl, $O_2$, CO, etc. which correspond to the output values of a result of the operation of the incineration facility] [the above values are stored in a form of one minute data (DB)] generating during the operations by the operator, and the initial design value of the incineration facility and the measured actual value obtained by measuring the heating value and composition of the wastes which change after the installation of the incineration facility; and a program wherein based on the data stored in the database, the design value, the measured actual value and the operation value are extracted, and the deign value, the operation value and the measured actual value are extracted into the data which contain a comparable graph type and a table type, and any difference with the initial design criteria value is analyzed, and the operation type of the operator is analyzed in real time, and the data on the operation adjusting range in the operation manual are analyzed in real time and are feedback to the operation control.

ADVANTAGEOUS EFFECTS

In the system and method for diagnosing and controlling an incineration facility and solid fuel boiler and managing the life cycle of a facility through a heat exchange and a design program and an operation mode analysis of an operator according to the resent invention, the data of one minute long are stored in the heat balance, the design program, the MMI which is an incineration facility control program, and the chimney automatic measurement system (TMS: Telemetering system), and based on the above data, the process design performance suggested when designing the initial incineration system and the actual operation value are compared and analyzed in real time, and via the real time diagnosis and analysis on the operation type of the operator, the combustion efficiency, for example, an operation group for each individual is evaluated, so an efficient operation and management of the incineration facility are available, thus enhancing energy power generation efficiency.

In addition, various analyses may be available in such a way that there are various search functions for certain items (an operation date, incineration facility outlet temperature, an exhaust gas amount, a steam generation amount, a combustion air amount, a waste agitating speed, etc.), and when the operator designates a predetermined rage, the designated range is analyzed, and any relationship with other search items can be reviewed, so the efficiency operation and management of the incineration facility are possible, thus enhancing energy power generation efficiency.

In particular, the present invention may be constituted into a system which can be installed on site, so the good combustion condition (3T) can be efficiently maintained in the combustion chamber in such a way to use the secondary amount of combustion air and automatic flow rate adjusting device which are appropriate to the combustion of various wastes.

In addition, it is possible to increase waste heat recovery energy in such a way to analyze and support in real time the operation values by the operators, and the PLM system may be used by applying the electronic tag (NFC) and a wireless communication technology, whereby it is possible to enhance the residual value of the facility.

In addition, technology power (professionalism) can be doubled in such a way to use a system wherein an operator's self-learning and remote diagnosis are available by enforcing an educational function with respect to a professional technology, for example, an incineration design program and an operation manual.

The additionally accumulated operation data can be analyzed in real time and can be feedback to a designing, construction and operation, so they can be used as a design factor. The present invention which can be developed in the form of a web may allow a 1:1 consultation between the operator on site and the related expert, and a continuous management is available.

The present invention may commonly apply to various incineration facilities (the incineration boiler, the solid fuel exclusive boiler), and since the waste heat recovery efficiency and facility residual value can be enhanced, it is possible to reduce CO2 which is one of globe warming substances.

BRIEF DESCRIPTION OF DRAWINGS

FIGS. 16 to 20 are views illustrating an example of an on-site facility history card.

BEST MODES FOR CARRYING OUT THE INVENTION

Figure 1:
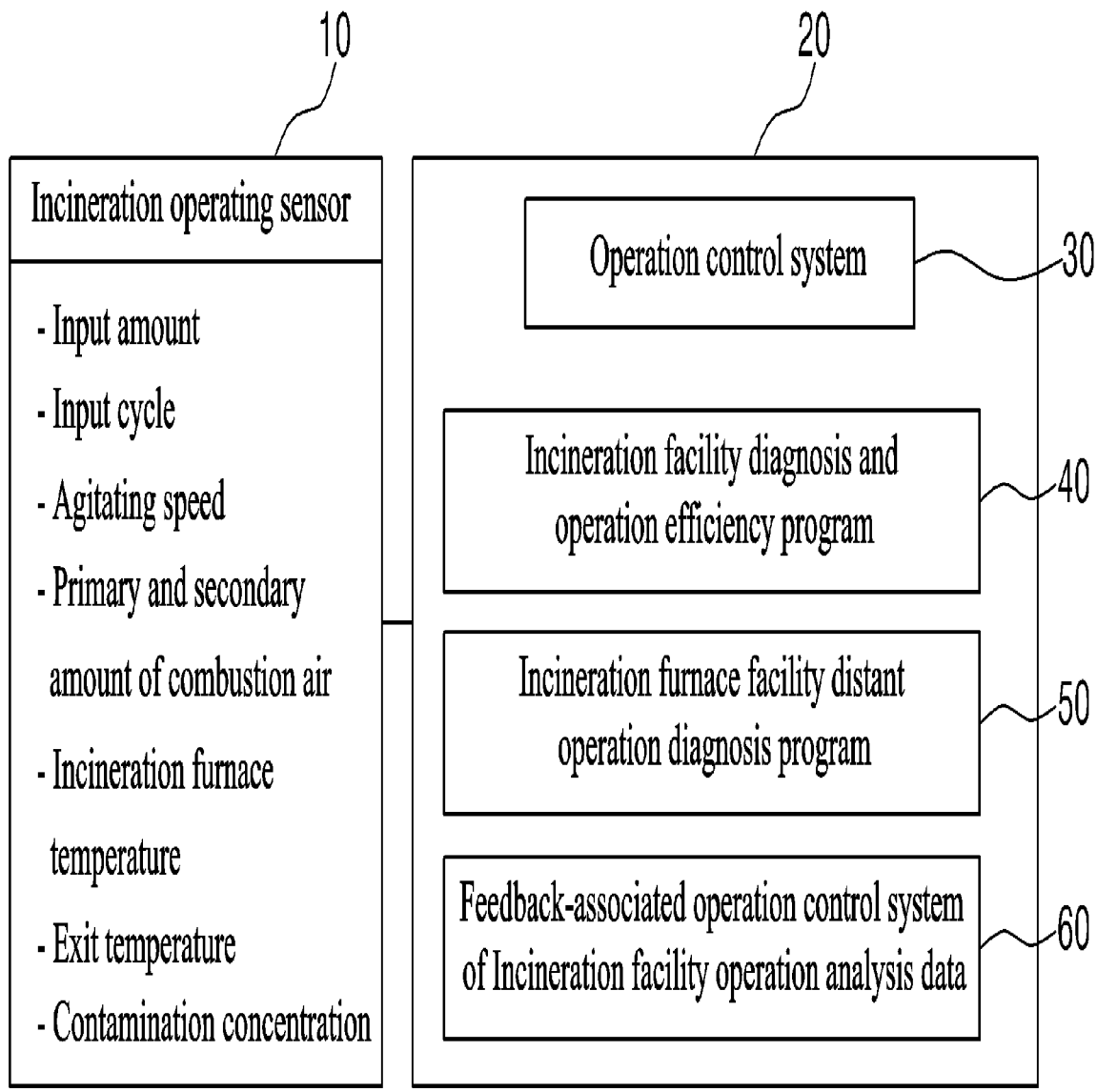
FIG. 1 is a block diagram illustrating a system for diagnosing and controlling an incineration facility and solid fuel boiler and managing the life cycle of a facility through a heat exchange and a design program and an operation mode analysis of an operator according to the present invention.

As illustrated in FIG. 1, the system for diagnosing and controlling an incineration facility and solid fuel boiler and managing the life cycle of a facility through a heat exchange and a design program and an operation mode analysis of an operator according to the present invention may include, but is not limited to, a database (DB) which stores an operation value detected by an operator in an onsite and control room when the incineration facility is in operation and detected by an automatic sensor [hereinafter referred to as "incineration furnace operating sensor (10)] and stored in the MMI (Man Machine Interface), a design value obtained during the initial design of the incineration facility, an measured actual value obtained by the actual operation; and a server 20 which generates a material for the PLM system via a heat balance of an incineration facility based on the data stored in the database and a diagnosis and control via a designing program and an operator's operation type analysis.

In the present invention, at an input port (an input hopper) of the incineration facility, a camera is installed, which is able to continuously take pictures of the kinds and composition of the wastes in order to operate and control under operation conditions which may allow to resolve the matters wherein the operation conditions of the incineration facility change as compared to the design criteria value due to the nature and heating value of various wastes while generating data for the sake of the PLM via the diagnosis and control of the incineration facility. The above camera is installed at the input port of the wastes and is able to photograph in real time the inputted wastes and is connected with the display of the operation chamber (a distant control chamber is available, thus providing the images to the operator for the operator to check the wastes. In the present invention, the operation data of the operator accumulated in the MMI was analyzed, and the analyzed result value and the kinds and composition of the photographed wastes are compared, and the wastes are sorted out by type (a heating value, size, kinds), thus sorting out tem based on the operation manual. In addition, the operation modes sorted out based on the operation manual are previously stored, whereupon the operator can select a predetermined operation mode being consistent with the occasion where the previously inputted wastes and the changed wastes are inputted, the detailed description of which will be provided below.

The design value (a) is a value which can be calculated based on the heat balance and design program with criteria to the design value of the initial incineration system. The measured actual value (b) is a value (this value is different from the design value since the wastes inputted during the actual operation have higher or lower values, not same, as compared with the heating value and composition (the three components: moisture, combustible component and ash) of the wastes which are actually applied when designing) obtained by measuring and analyzing the heating value and the three components (moisture, combustible components and ash) by sampling the wastes (a sample collection), the operation value (c) is a result values actual operated by the operator.

The measured actual value (b) may be measured in various ways (monthly or quarterly measurements or annual measurement) in consideration of the on-site conditions of the incineration facility.

In addition, the operation value (c) uses an operation data of the operator stored in the MMI and measurement values by various sensors in the incineration facility, provided that the operation value (c) uses a data DB of one minute interval stored in the MMI, and the design value (a) uses the data from the designing company which has initially designed the data, and the measured actual value (b) uses the design value of the designing company which has initially designed the data using the measured and analyzed value on the wastes, all the values of which are calculated based on the heat balance and designing program and are used.

Even when an incineration facility is constructed based on the design and is operated, it is common that the measured actual value is different from the design value (due to external factors, for example, any change in the policy on the wastes and the lack of waste separation and collection by the waste disposal business person). Therefore, the PLM of the facility is necessary to enhance the operation efficiency of the incineration facility and the residual value of the facility. For this, it is preferred that the design value and the measured actual value are together used as a comparison group of the operation value.

That is why it is possible to establish a feedback system wherein that whether or not the design intention of the initial designer of the incineration facility was accurately reflected can be clearly determined, and if the intention of the designer was not reflected, it is possible to analyze whether or not such a cause comes from a part of the construction or a part of the operation by the operator or whether or not the kinds and the composition and heating value of the inputted wastes are different from the design values, whereby the analyzed causes can be reflected to the maintenance and when designing the incineration facility.

The operation value is detected by the incineration facility operating sensor 10 and is stores into the database via the MMI, and the incineration facility operating sensor 10 and the MMI use the data previously provided in the conventional incineration facility. In case of a new incineration facility, the incineration facility operating sensor 10 which is appropriate to the present invention may be adapted when initially designing the MMI program.

The incineration operating sensor 10 will detect the data which are necessary for the operation of the incineration furnace and the data which generate due to the operation.

The data which are necessary for the operation of the incineration furnace may consist of the input amount of wastes, the input cycle of wastes, agitating speed (a fire grate, Kilin, a fluidized-bed, etc.), primary and secondary amount of combustion airs, etc. The data which generate due to operation may consist of the temperatures at the incineration furnace and the prevention facility [(various temperatures: temperature at the mouth, temperature at the exist, etc.), the amount of exhaust gas, environment contamination substances (SOx, NOx, HCl, CO, DUST, $O_2$) and various facility measurement values. The incineration furnace operating sensor is provided to detect the above-mentioned data.

The incineration furnace operating sensor is able to sense all the data which are necessary for the operation of the incineration furnace except for the above mentioned data.

The data detected by the incineration furnace operating sensor may use the actual operation values which may be necessary in the present invention.

The present invention might use a conventional incineration facility without applying by newly installing the incineration facility operating sensor 10. Namely, the values stored in the MMI provided for the operation of the conventional incineration facility may be used.

For the sake of the efficient operation of the incineration furnace according to the present invention, the present invention may need a design value (a: the design value when initially designing the incineration facility), an measured actual value (b: the heating value and composition of the wastes which will change after the installation of the incineration facility), and an operation value of the operator (c: the value that the operator has actually operated), and a database may be constructed to compare and analyze such data in real time. The data (a, b, c) stored in the database may be outputted in various forms, for example, number, graph, etc., so the manager and consultant may determine the performance of the incineration facility based on the operation by the operator by simply seeing the data sheet, and the operator may compare and analyze the operation value that another operator has operated with, which value is different from the operation value that the operator himself has driven with. In addition, the professional portion may consist of a system wherein a 1:1 consultation is available in a distant way (configured on the web) with a professional consultant.

The database previously stores the design value inputted by the manager and the professional consultant and measured actual value (by using the values which are inputted at every one minute in the MMI), and the operation values by the operator may be automatically analyzed at every one hour together with the design value and the measured actual value.

The data stored in the database may be sorted out by date and at every certain time (in at least every minute) into the amount of waste input, the agitating speed of wastes (a fire grate, a Kilin rotation furnace, a fluidized-bed), incineration furnace exit temperatures (primary and secondary) by the adjusting values of primary air blower opening rate and secondary air blower opening rate, primary amount of combustion air (including flow rate), secondary amount of combustion air (including flow rate), total combustion air amount, total exhaust gas amount, steam generation amount, contaminants [(NOx, CO, SOx, HCl, dusts, etc.)] and the operation states of various on-site facilities [valve opening rate, pressure, lubricant level, operation states, etc.], and may be automatically stored.

The present invention may allow to confirm the operation type and habit of the operator based on the above-mentioned data and may provide the following program for the sake of efficient operation of the incineration furnace.

The present invention is directed to the system for a waste resource energy recovery efficient enhancement in an incineration facility and a stable operation and a PLM (Plant Life cycle Management) of the facility by using a heat balance and a design program and an operation type analysis material of an operator, wherein the data (a, b c) of an initial design value (a) of the incineration facility, an measured actual value (b) which generate due to the operation of the incineration facility and obtained by measuring the composition and heating value of the wastes, and an operation value (c) which represents the operation adjusting value that the operator actually operates with and an output value which is a result value of the operation are stored at every one minute in the MMI (Man Machine Interface) which is a control program of the incineration facility. If there is not a separate analysis program, an analysis in real time is hard since the amount of the stored data is huge, if there are an error in the on-site facility and a problem with operation, the operation value (the waste input amount, combustion air amount, agitating speed, device operation state, etc.) by the operator and the operation output value (temperature, pressure, exhaust gas amount, contaminants, etc.) are compared for the sake of cause analysis. The operator who lacks a professional knowledge is hard to practically analyze, and even a manage who majored in engineering is hard to comprehensively analyze the intention of the initial designer and the accumulated data, so recognizing the cause of the problem is a common operation type. In particular, there is a lack of the system wherein the operator and the manager can share the analyzed result. For this reason, there may be phenomenon wherein mistakes with respect to the error in the facility may repeatedly take place. In case of various on-site facility checks (device operation states, for example, temperature, pressure, vibration, etc.) which occurs three or four times per day, such phenomenon is recorded manually with hands on a situation board, and there is a lack of any continuance of the data, and the integrated management is hard. In the present invention, a comparison and analysis in real time and a report preparation and output are available by using the heat balance program and the incineration facility design program and the operator operation type analysis program which all are installed in the database. When the operator inputs a checked state of the on-site facility on the portable terminal at the on-site using the electronic tag (NFC) attachment and the near field wireless communication technology, the integrated data management and the automatic operation control are available, wherein the inputted data can be automatically sorted out and managed.

In the drawing of the present invention, the numbers used therein are assigned base on the models which in general are used in the designing and operation of the incineration facility and are not used to limit specified models. Such numbers are assigned based on the measured actual values actually measured with respect to the initial design value with criteria to the models of the conventional incineration facility, and the operation values. The above numbers are not assigned any special meaning.

The server (a controller) 20 according to the present invention may be formed of four components, namely, it may include, but is not limited to, an operation control system(including MMI) 30 of an incineration facility; an incineration facility diagnosis and operation efficiency program (including PLM) 40 which is formed of five chapters; an incineration facility distant operation diagnosis system 50; and an operation control system 60 configured to operate via the feedback of an incineration facility operation analysis data.

The operation principle of the system may be carried out on the LCC management program via the near wireless communication, in particular, may be carried out on the incineration facility integrated management system, wherein when the operation adjusting value of the operator and the incineration furnace operation output value which generate at every one minute interval during the operation of the incineration facility are automatically stored in the MMI (Man Machine Interface) which is a control program of the operation control system 30, the above data are automatically stored in the integrated database of the incineration facility diagnosis and operation efficiency program 40 (the file transfer protocol: FTP), and the operation, control, diagnosis and evaluation are carried out based on the stored data, and the 1:1 distant consultation is available with the operator based on the Web.

Figure 2:
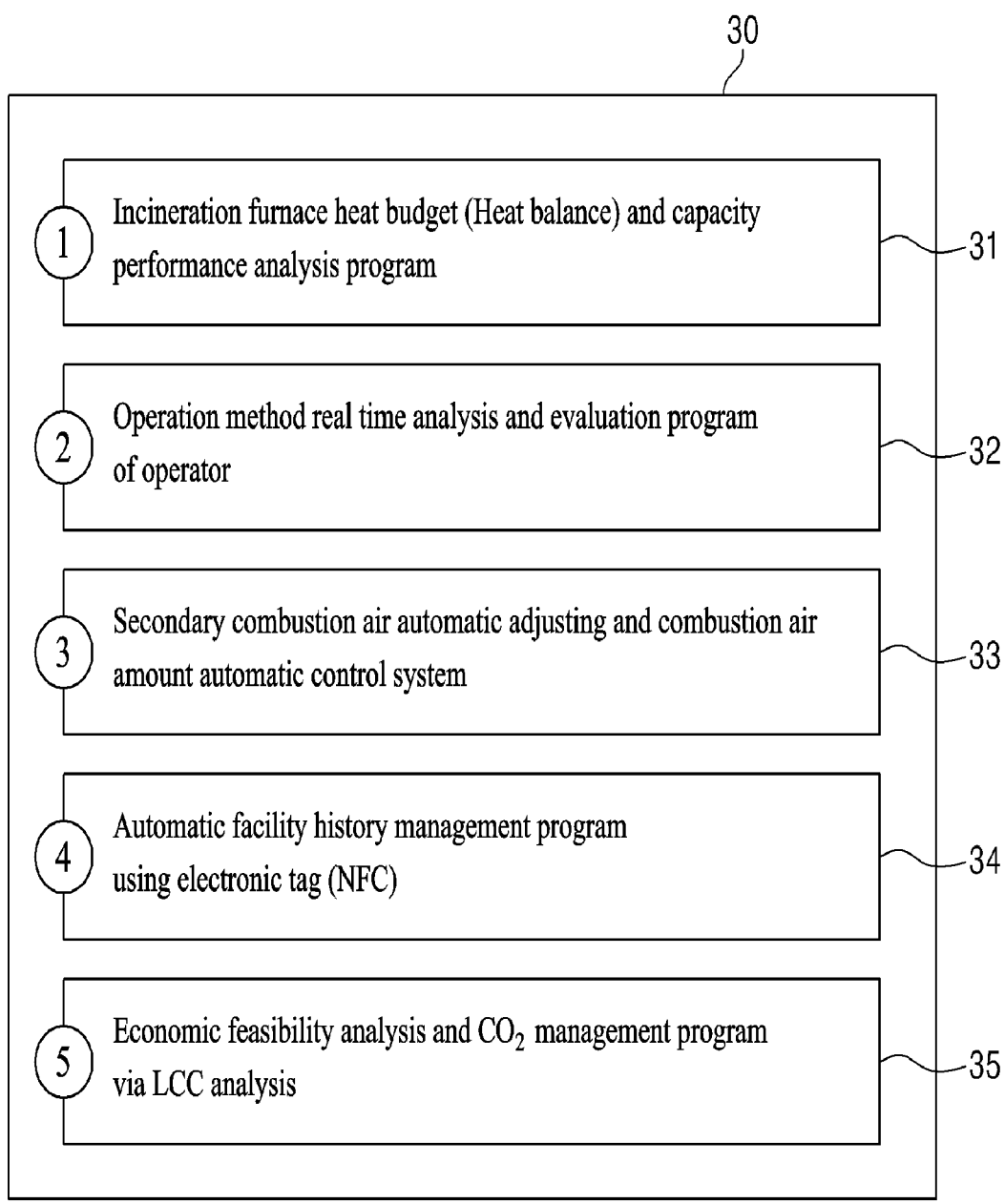
FIG. 2 is a block diagram illustrating a configuration of an operation control system of an incineration facility which is adapted to a system for diagnosing and controlling an incineration facility and solid fuel boiler and managing the life cycle of a facility through a heat exchange and a design program and an operation mode analysis of an operator according to the present invention.

As seen in FIG. 2, the first chapter may include a process design and capacity performance analysis program 31 which uses a heat budget and a mass balance, wherein the initial design value of the incineration facility and the changing heating value of the wastes are measured, and the measured actual values are used in the known heat balance program.

The second chapter may include a program 32 formed of a file transfer protocol (FTP) system wherein the data (a design value, an measured actual value, and an operation value corresponding to an actual operation) are transferred at every one minute to the MMI (Man Machine interface) which is the incineration facility control program), thus automatically carrying out the performance evaluation and the diagnosis and evaluation in real time and the third chapter may include an automatic control program 33 wherein the secondary amount of combustion air and automatic flow rate adjusting system are installed, and the incineration facility operation adjusting values (the primary and secondary amount of combustion air, the agitating speed, etc.) can be automatically controlled so that the operator can automatically operate using the data which are accumulated and analyzed in the first and second chapters. The fourth chapter may include a PLM history management program 34 wherein the electronic tag (NFC) is attached to the on-site facility and the near wireless communication network is used. The fifth chapter may include an economic feasibility analysis and carbon dioxide management program 35 which can be carried out via the PLM analysis.

In the programs of the first to fifth chapters, independent analysis and diagnosis functions are available, and the five programs may be concurrently shared, and they may have functions which may be used in various forms for the integrated data management system wherein the data analyzed during the designing, construction and operation of the incineration facility can be automatically feedback.

1. The first chapter: the capacity performance analysis with respect to the heat budget (Heatbalance) and the mass balance (Massbalance) (an incineration facility design and capacity comparison analysis based on the waste actual measurement change using the initial incineration facility design value).

The performance of the incineration facility has a very close relationship with the kinds, composition and heating value of the wastes which are inputted into the incineration facility. Since the wastes having different composition as compared with the initial design wastes are frequently inputted into the incineration facility, various problems may occur, for example, the performance of the incineration facility may be lowered, and the facility may have errors. Namely, when designing the incineration facility, the kinds of the wastes are determine, and the incineration performance may be enhanced and the service life can be prolonged in case where only the design wastes are incinerated. Since it is hard to incinerate only the design wastes according to the current situation, the incineration performance which is different as compared with the designs may occur. Of course, only the design wastes may be provided via the pre-treatment process, for example various pre-sorting processes, but the sorting-out process may entail a lot of costs and a complicated process, so it is not practical.

Figure 3:
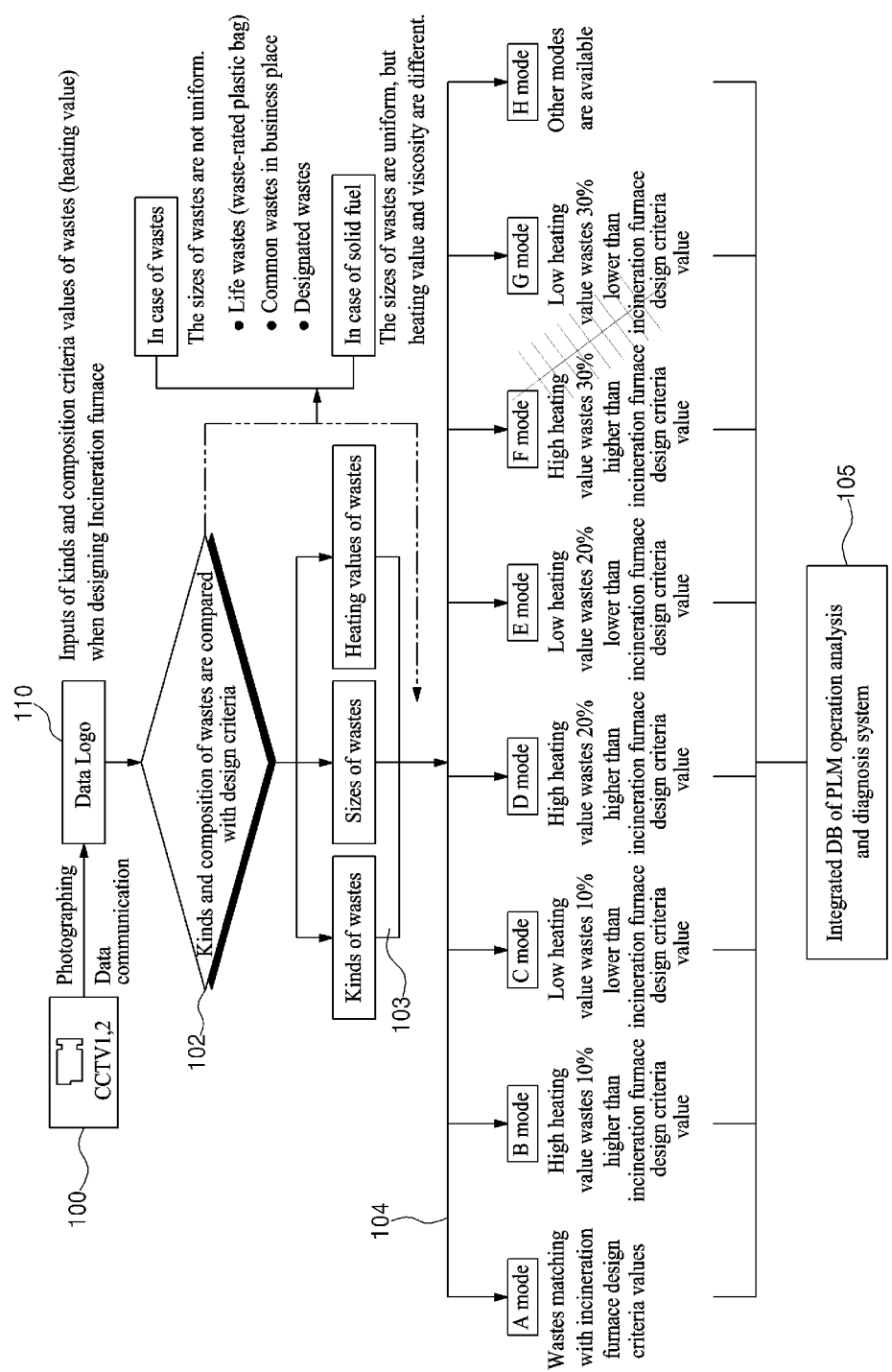
FIG. 3 is a flow chart illustrating a waste composition analysis using a camera.

As seen in FIG. 3, in order to resolve the above problems, a camera (CCTV) 100 is installed on the top of the incineration facility input hopper, which is able to continuously take pictures. Wastes with various natures [kinds, sizes and heating values of the wastes] are classified and previously inputted and stored in the database, and such wastes are compared with the wastes which are photographed by the camera 100, thus selecting an operation mode. At this time, when sorting out the wastes by kind, the wastes may be sorted out within a range of 100% based on the initial design values (for example, if the value is higher than the design value, the wastes may be sorted into A-mode (above 10%), B-mode (above 20%), C-mode (above 30%) and D-mode (above 40%), and if it is lower than the design value, the same sorting may be used). In the system for diagnosing and controlling an incineration facility and solid fuel boiler and managing the life cycle of a facility through a heat exchange and a design program and an operation mode analysis of an operator according to the present invention, the analyzed data are sorted out by mode of the wastes and are managed. That is why the values of the data analyzed in the system according to the present invention should be sorted out and analyzed based on the kinds, composition and heating value of the wastes (the incineration facility is designed based on the values of wastes, and the operation methods are different), whereby such data can be used for the subsequent design diagnosis, the operation type analysis of the operator, the cause analysis on the facility error, and the method for improvements, and feedback for design and maintenance.

The images taken by the camera 40 may be displayed on the monitor in the operation chamber, and the operator may confirm the images (the kinds, sizes and heating values of the wastes) displayed on the monitor, and the operation mode being consistent with the incineration of the wastes which are being currently inputted can be automatically selected among the previously stored operation modes.

If the operation mode is selected as a manual mode, the operator determines the kinds, composition and heating value of the wastes and carries out the optimum operation matching with the condition, and the accumulated operation data are automatically stored into another operation mode. Such operations are directed to a system which is able to correct and supplement the operation method with respect to the wastes which are subjected to various changes, thus enhancing efficiency of the data with respect to the operation method of the operator.

In addition, the present invention provides a way to enhance the performance and operation direction of the incineration facility even when the kinds, composition and heating value of the inputted wastes change in such a way that, different from the operation data accumulated in the actual operation value, the present invention may suggest the range and method with respect to the operation and facility management suggested in the design after comparing and analyzing the design value and the measured actual value.

The design values may be calculated, for example, in such a way that when the composition of the wastes, the three components which are the design values, component construction ratios (C, H, O, N, S, Cl), the sizes of the incineration facility, the capacity design values (air ratio, incineration amount, heat load level, grate capacity level, dust flow rate, etc.) are inputted, the heat budget (Heatbalance) calculation values (incineration facility outlet temperature, primary and secondary amount of combustion airs, total combustion air amount, steam generation amount, nitrogen oxide, carbon monoxide, sulfur oxides, hydrogen chloride, dust, etc.) are automatically outputted via the known incineration capacity calculation program, and into the incineration capacity and prevention facility capacity design input window, the outputted values are automatically inputted as a design necessary for the designing of the incineration facility and the prevention facility. The values are automatically calculated on the mass balance and incineration capacity automatic calculation program based on such values and are outputted as the incineration capacity and prevention facility output value (the primary combustion chamber volume, the secondary combustion chamber volume, the total combustion chamber volume, the fire grate area, the steam generation amount, the SDR capacity, the BAG capacity, the BAG filtering speed, the number of the BAG filtering cloths, the SCR capacity, the diameter of the washing tower, the volume of the washing tower, etc.), the values of which can be extracted by the conventional technology.

In this way, the incineration facility is compared and analyzed using the design value and the measured actual value, so the design capacity can be analyzed before and after the designing of the incineration facility.

It is possible to confirm whether or not there is a difference in the design and the actual operation based on the change in the input wastes via the design value and the measured actual value.

The incineration facility which has been once constructed may not be reconstructed due to such a difference (since it is impractical to reconstruct the expensive incineration facility), but with the aid of the difference between the design value and the measured actual value, it is possible to suggest the operation direction of the incineration facility to an operation direction appropriate for the measured actual value. For this, since it is possible to use an appropriate operation method of the incineration facility, the incineration performance can be enhanced, and the service life of the incineration facility can be prolonged.

In the present invention, since the operation value can be detected at the same time (1 minute DB) cycle with respect to the measured actual value of the inputted wastes which correspond to the operation value of the current incineration facility with criteria to the design value through the incineration facility operating sensor 10, the design value, the measured actual value and the operation value can be presented in the form of graph, etc. so that they can be checked in real time while comparing such values, and simply compared data are also provided. In addition thereto, the data on the time and section that the operation wants can be freely searched, and the searched data can be automatically analyzed. The target value can be set for the sake of enhancement of the operation by the operator, and the target values and the operation value can be compared, and a 1:1 distance consultation with the related expert is available in real time. In particular, an education program on the incineration facility design and management may be added, so a self-learning can be obtained together with the operation of the incineration facility.

Figure 4:
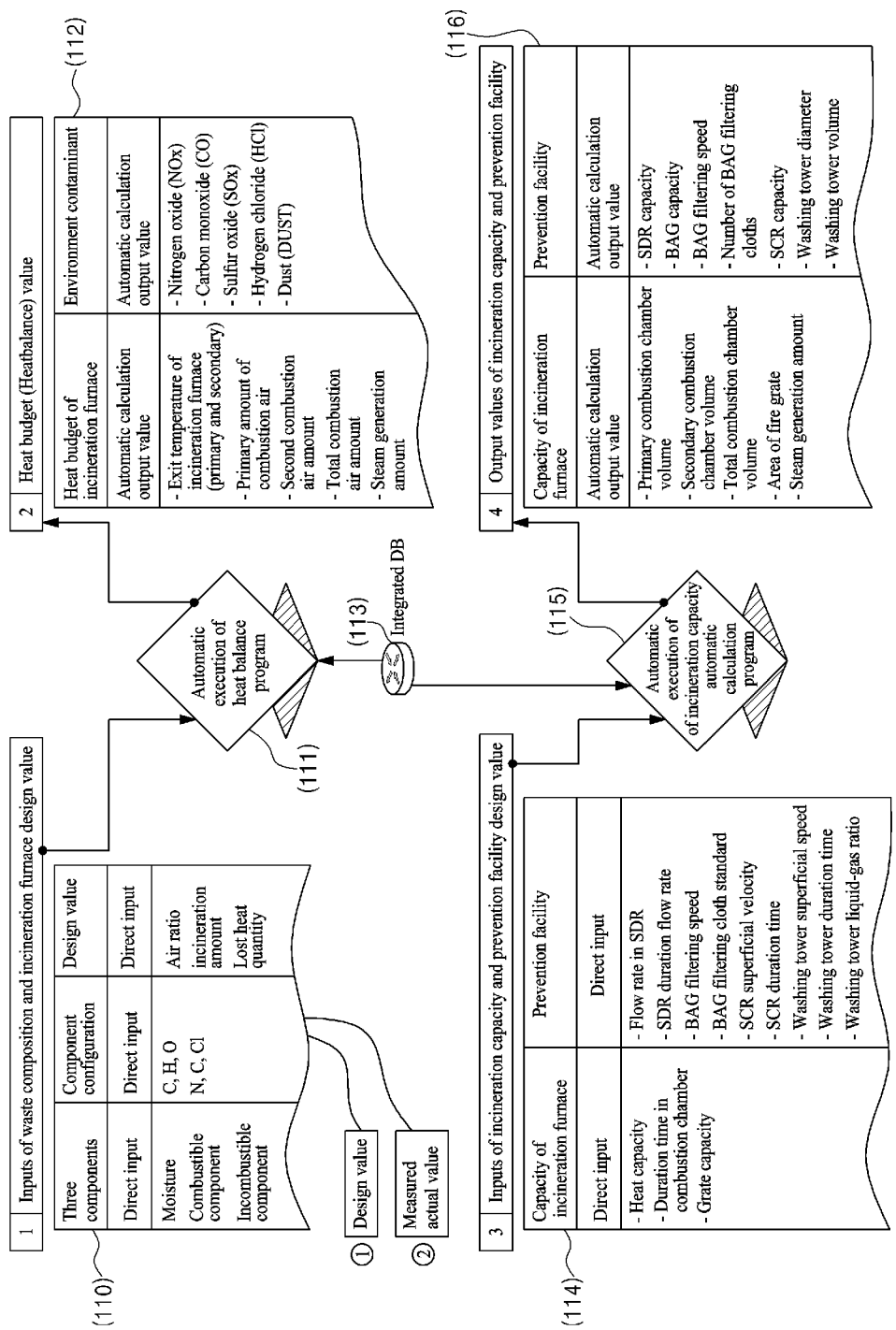
FIG. 4 is a view illustrating an example of an incineration furnace heat budget and an incineration capacity calculation program.

As illustrated in FIG. 4, when designing the incineration facility, the heat balance program 111 (Heatbalance), the known mass balance and the incineration capacity calculation program 115 are used. In the present invention, the calculation formula of the mass balance and incineration capacity calculation program 115 is formed of the integrated DB 113 (the integrated DB mean the above described database and may be same as the integrated DB below even they have different criteria numbers).

For the sake of comparison and analysis between the initial incineration facility design criteria value and the measured actual value obtained by actually measuring the composition and heating value of the wastes which are inputted after the installation of the incineration furnace, when the composition of the waste, the three components which correspond to the incineration furnace design values, the component construction ratios (C, H, O, N, S, Cl), and the incineration furnace basic design values (air ratio, the incineration amount, the grate capacity level, the heat capacity level, the lost heat quantity, the flow rate, other design constant values, etc.) are inputted on the input window 110, the heat balance (Heatbalance) calculation values (the incineration furnace exit temperature, the primary and secondary amount of combustion air, the total combustion air amount, the steam generation amount, the nitrogen oxide, the carbon monoxide, the sulfur oxide, the hydrogen chloride, dust, etc.) are automatically outputted (112). The thusly output values are automatically inputted as design values which may be used when designing the incineration furnace and the prevention facility. The values may be automatically calculated based on the above result and by the mass balance and incineration capacity automatic calculation 115 and are outputted as the incineration capacity and prevention facility output values 116 (the primary combustion chamber volume, the secondary combustion chamber volume, the total combustion chamber volume, the fire grate area, the steam generation amount, the SDR capacity, the BAG capacity, the BAG filtering speed, the number of the BAG filtering cloths, the SCR capacity, the diameter of the washing tower, the volume of the washing tower, etc.).

The incineration furnace and the prevention facility are compared and analyzed using the design value and the measured actual value, and the design capacities before and after the installation of the incineration facility are compared and analyzed, so any diagnosis on the capacity change (up and down) when the operator operates the incineration facility can be available. For this, it is possible to understand the characteristics of the incineration facility based on the change in the inputted wastes when the operator operates the incineration facility.

Second, the present invention may allow that the heat budget and the capacity of the incineration facility and the prevention facility can be compared and analyzed with criteria to the design value (a), the measured actual value (b) and the operation value (c) using the heat budget (Heatbalance) and the design capacity program with the aid of the operation value which generates during the actual operation.

Figure 5:
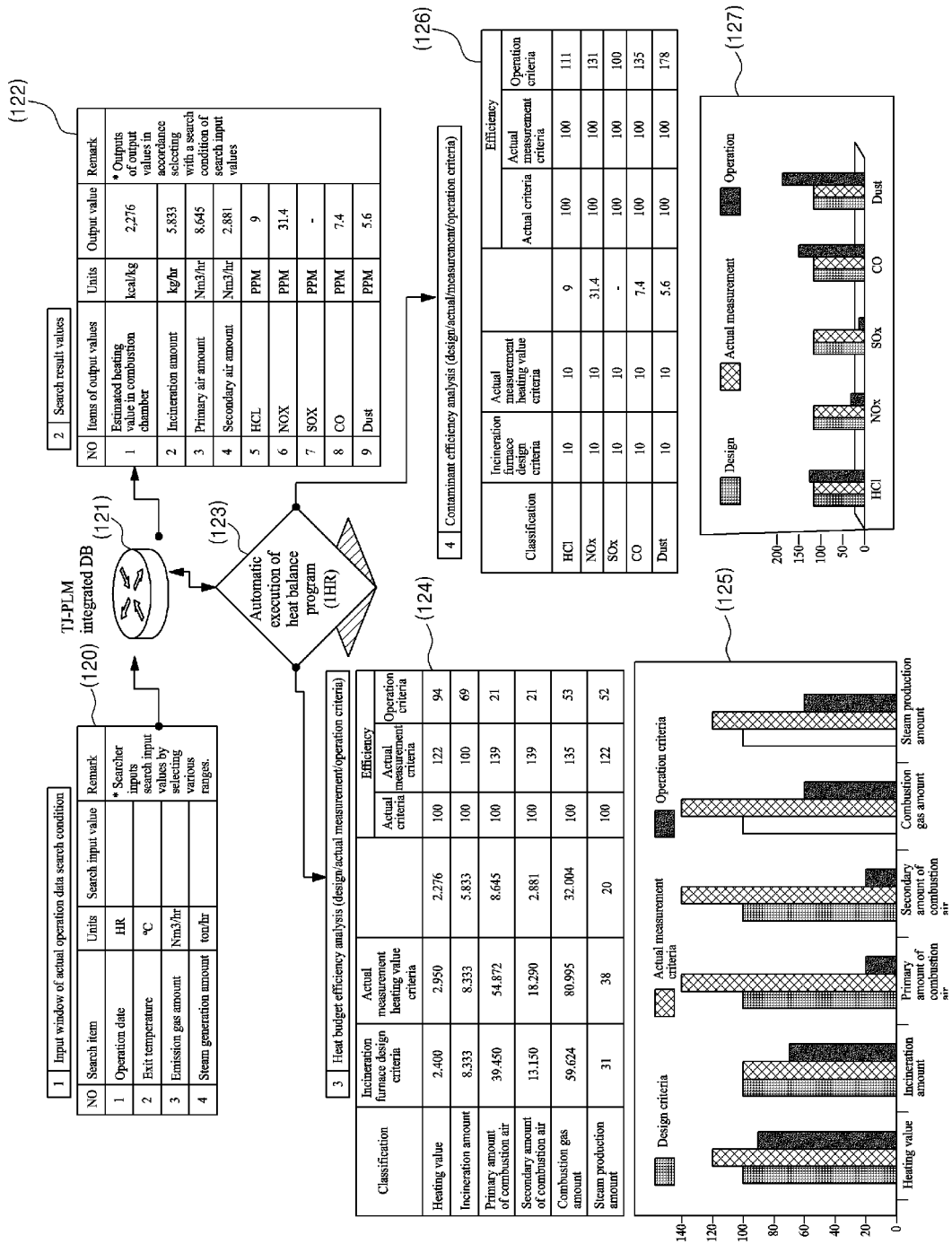
FIG. 5 is a view illustrating an example of an incineration furnace heat budget analysis program using an actual operation data.

As seen in FIG. 5, in order to analyze at every one minute the heat budget (Heatbalance), the search range is set in the DB 30 of the operation value which will be analyzed, and the researched result values are analyzed. When the search values (the operation date, the exit temperature, the exhaust gas amount, the steam generation amount, etc. are inputted along with their ranges) are inputted for each item or integrally on the search input window 120, the result values (the estimated heating value in the combustion chamber, the incineration amount, the primary air amount, the secondary air amount, HCL, NOx, SOx, CO, dust, etc.) based on the input values may e automatically searched from the integrated DB 13, and the values may be automatically calculated at each one hour interval and are displayed on the output window 122. Namely, the search values and the result values are together stored in the integrated DB 113.

When the heatbalance program 111 is automatically executed with the output value on the output window 122 being defined as an input value, the design criteria, the actual measurement criteria and the operation criteria value are automatically displayed on the output window in the forms of the table 124 and the graph 125 as the efficiency analysis values of the incineration facility heat budget.

In addition, the capacities of the incineration facility and the prevention facility may be compared and analyzed using the actual operation data. Like in FIG. 6, when the search range is inputted on the search input window 130 in the same way as described in FIG. 5, the output values with respect to the input value are automatically searched from the integrated DB 113, and are outputted on the output window 132. The known capacity automatic calculation program 133 is automatically executed based on the above output value, and the combustion chamber volume 134, the primary and secondary amount of combustion airs 135, the fire grate area 138, the semi-drying type washing tower 136, the selective catalyst reduction tower 137, the waste heat boiler 139, the filtering dust collector 130, the capacity and design constant values (the duration time, the filtering speed, the recovery heat quantity, the superficial velocity, etc.) of the washing tower 141 are automatically compared and analyzed with the design criteria, the actual value and the operation criteria value and are outputted in the form of graph, etc.

Since the heatbalance efficiency analysis value and the mass efficiency analysis value can be set in various ranges on the operation data search input window 120, when the ranges of the operation normal section and the exceeding section and the specific section are set, and the values are inputted as one hour average value, the heat budgets of various items, the contaminant efficiency, the capacities of the incineration furnace and the prevention facility can be analyzed, and the design value by the initial designer and the measured actual value of the actually loaded wastes can be comprehensively analyzed with the analysis values with respect to the operation type that the operator operates, thus analyzing the efficiency with respect to the design value, the measured actual value and the operation value.

The estimated heating value (the heat quantity calculation value of the wastes which are actually combusted in the incineration furnace) which is one of important variables to analyze the combustion efficiency of the incineration furnace is different at every input timing of the inputted wastes, so the calculation value with respect to the heating value level of the wastes which are combusted in the incineration furnace is calculated using the known heat budget calculation formula 153, thus calculating the estimated heating value. The operation type of the operator and the kinds and composition of the inputted wastes can be estimated using the calculated values, so it is possible to efficiently use during the operation of the incineration furnace.

As for the description on the calculation of the estimated heating value, the search ranges (the operation date, the exit temperature, the exhaust gas amount, the steam generation amount) are inputted on the actual operation data search input window 150, and when the items 152 which are necessary to obtain an estimated heating value are automatically searched from the integrated DB 113, the actual operation data value (one hour average value) is outputted, and the emitting heat quantity (the incomplete heat loss amount, the heat quantity among the initial design values of the incineration facility are inputted based on the outputted values, and the incineration furnace exit temperature and the actual exhaust gas amount which are the actual operation values of the incineration facility are automatically calculated on the MMI and in the one minute DB.

The estimated heating value automatic calculation program 153 is automatically executed using the thusly inputted data values and on the heat budget (total input heat=total output heat) calculation formula, thus outputting the estimated heating value 154. This value may be analyzed with the heating value (the actual measurement heating value) of the design criteria, the heating value (the actual measurement heating value) of the actual measurement criteria, the estimated heating value (the estimated heating value by calculation with respect to the wastes which are combusted in the incineration furnace) of the operation criteria and may be outputted in the form of the graph 155, etc.

2. The second chapter: the operation type and combustion efficiency real-time analysis via the operation adjusting value analysis of the operator which is automatically stored in the MMI (Man Machine Interface).

Figure 8:
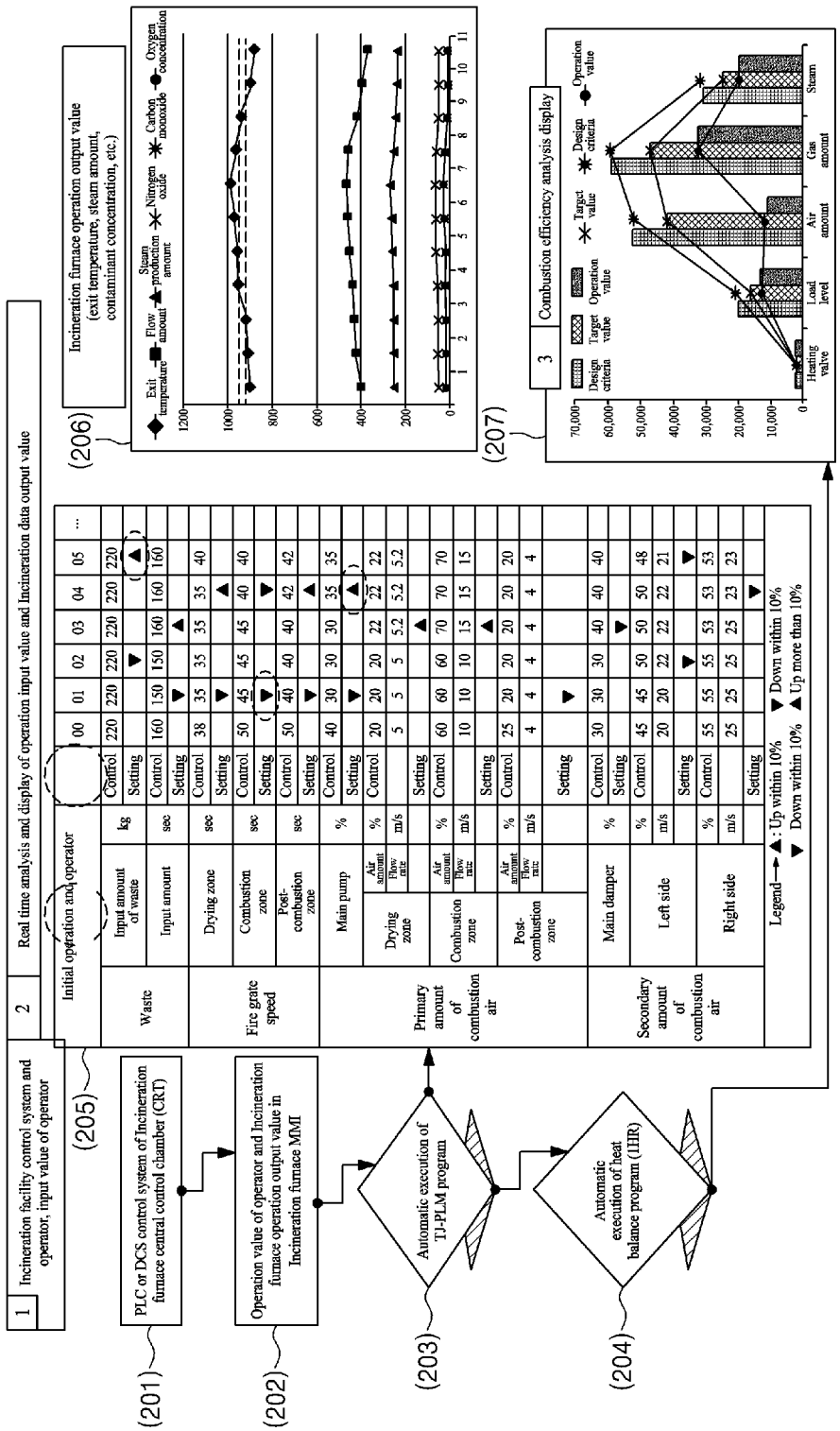
FIGS. 8 and 9 are views illustrating an example of an incineration furnace output value real time analysis program based on an operator's operation input value.
Figure 9:
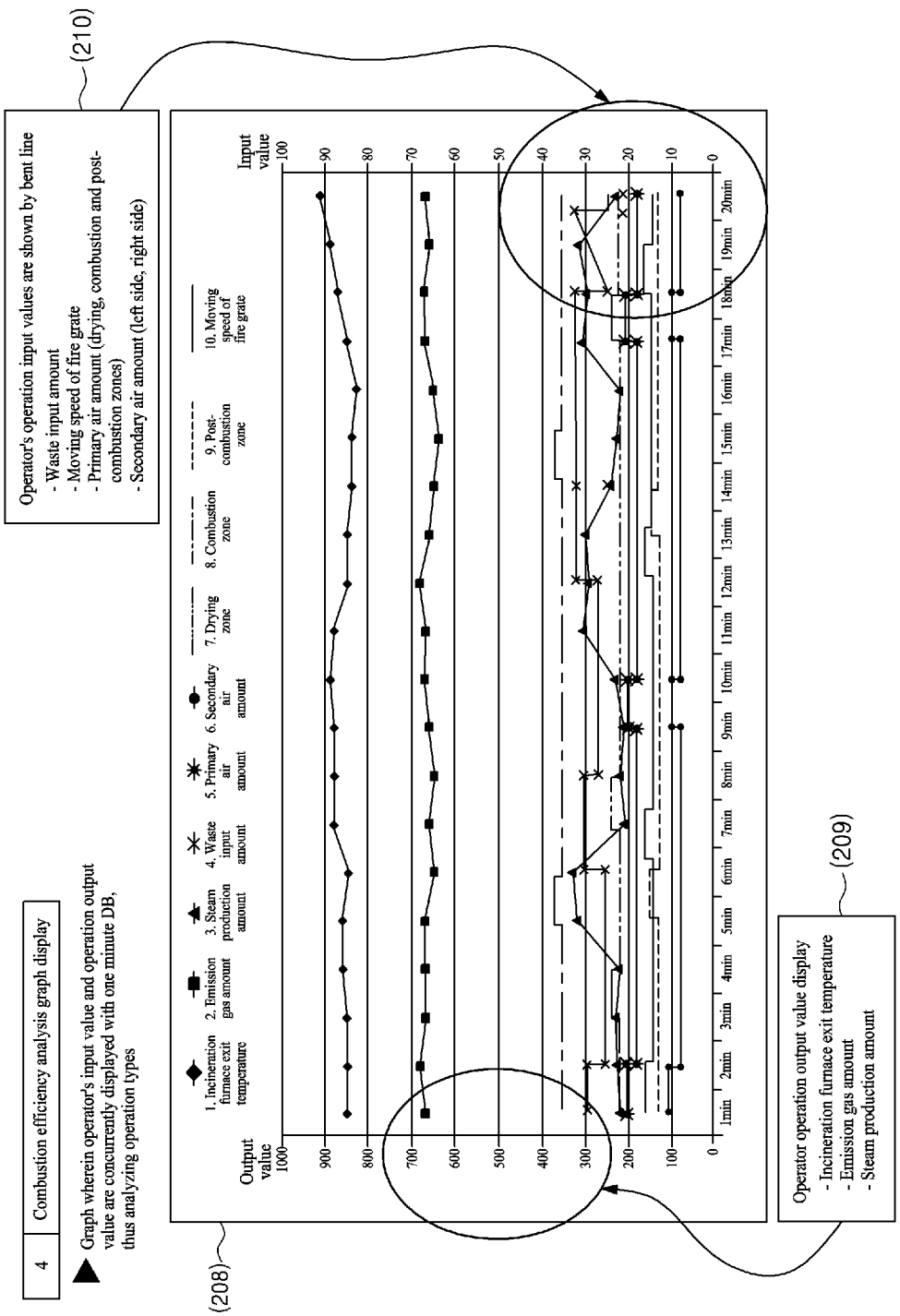

As illustrated in FIG. 8, the MMI (Man Machine Interface) which is a control program, is installed at the incineration facility central control chamber 201, thus controlling the whole data. The operation adjusting value 205 of the operator, the operation output value 208 (FIG. 9) and the measurement value of the on-site facility are stored at every one minute interval. In order to automatically analyze the stored data, the data stored at every one minute interval in the MMI (Man Machine Interface) which is an incineration facility control program are constituted in the file transfer protocol (FTP) system, thus communicating in real time with the integrated management system.

In order to analyze the operation adjusting value of the operator, an input window is provided on the top of the table for the real name of the operator to be filled. As the analysis items, the time that the operator has adjusted is formed with an arrow with respect to the adjusting values formed of the onetime input amount (KG) of the wastes, the input cycle (second), the agitating speed of the wastes [(the fire grate moving speed, the Kilin rotation speed, the fluidized-bed sand flowing speed)], the primary amount of combustion air (the damper opening rate), and the secondary amount of combustion air (the damper opening rate), and the increase and decrease of the adjusted values are formed to be indicated by 10%, and the increase is indicated with an upward arrow, and the decrease is indicated with a downward arrow, so the values above or below 10% may be formed with different colors.

Subsequently, the incineration furnace operation output value 208 is formed with the same time as the time that the operator has adjusted the operation value and is presented on the same screen in the form of the graph, etc. As the output items, the incineration furnace exit temperature (° C.) which is the criteria value representing the combustion efficiency, the exhaust gas amount ($Nm^3/hr$), the steam generation amount (ton/hr), the primary combustion air discharge flow rate (m/sec), the secondary combustion air discharge flow rate (m/sec), NOx, CO, $O_2$, and contaminants [(SOx, DUST, HCl)] are all presented on the same graph.

To this end, it is constituted that the output window of the operation adjusting value and the output window of the operation output value can be displayed on the same screen, so the operator can operate comparing the output values with respect to the operation adjusting values that the operator himself has operated, which are provided in the form of functions, and the operation target is added based on the design value, and the analysis may be carried out in real time in cooperation with the combustion efficiency analysis graph 207 formed to display the efficiency comparison with the actual operation value by adding the operation target with respect to the design value, the measured actual value and the operation value. Additionally, the operation adjusting value and the operation output value may be presented on one graph 208 (refer to FIG. 9). It may be constituted that at the left side, an operation output value 209 of the operator is provided, and at the right side, an operation input value 210 of the operator is provided. The line type that is bent at a right angle on the lower side of the graph 208 represents the type of the operation input value 210 of the operator, and the remaining graphs in the form of lines represent the operation output value 209 of the operator. The graph 208 equips with a function wherein the operator can analyze the flow of the operation input value 210 based on the operation output value 209. It is advantageous that the current operation state of the incineration furnace can be recognized with only the graph.

Figure 10:
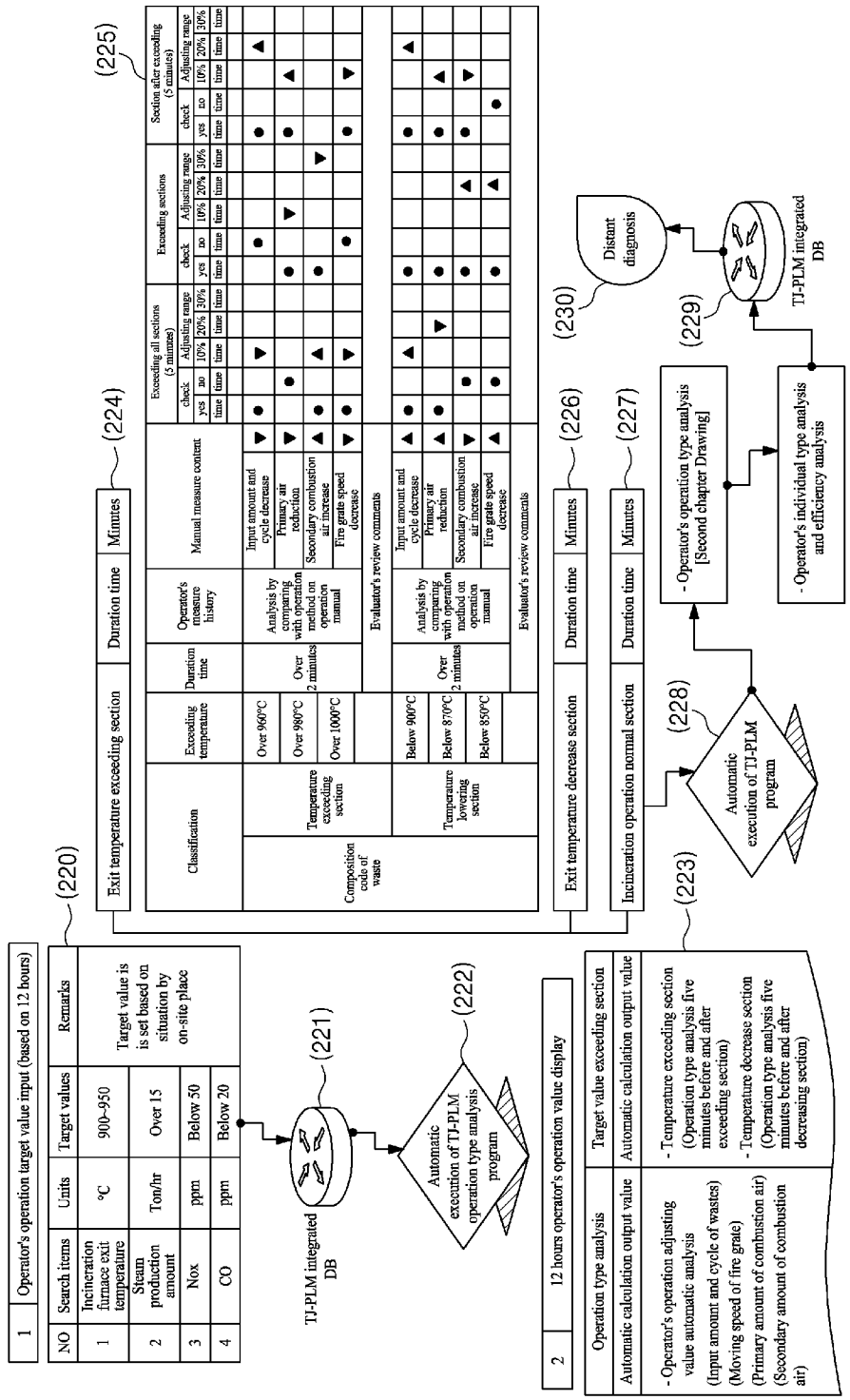
FIG. 10 is a view illustrating an example of an individual and operation group-associated operation type via an efficient operation target value setting, a target value exceeding section automatic research and an operation type automatic analysis program in a search section.

The present invention may be configured so that a result of the operation by the operator can be checked. FIG. 10 is a view illustrating a configuration wherein an operation result value corresponding to the operator's operation for 12 hours is analyzed. First of all, the present invention is directed to an operation method by means of the operation manual (224: the method for coping with when the exit temperature increases or decreases) suggested when designing the incineration furnace based on the operation target value 220 and the incineration furnace exit temperature 224 which are inputted as the analysis unit 222 of the server is automatically executed in such a way to search the data 205 wherein the operation adjusting value of 12 hours that the operator has operated are automatically stored, after the most efficient operation target value is established for the incineration facility and is inputted (220). In the above method, it is possible to automatically output whether or not the operator has operated [(223: the operator operation type analysis)] or the duration time of the incineration furnace exit temperature target value exceeding 224, the decrease 226 and the normal section 227 are automatically searched and outputted. Here, the sections of the target value exceeding 224 and the decrease 226 are presented in the form of the table 225, and the time 5 minutes before and after the duration sections of the exceeding 224 and the decrease 226 are set, and the operation manual is compared with respect to the operation method of the operator with respect to the above section, and the exceeding and decrease section automatic checking program 228 (controller) is automatically executed and analyzed. Here, when operated matching with the operation method suggested on the operation manual, it is indicated with a blue color, and if any adjusting value is not adjusted, it is indicated with a red color, and the increase and decrease in the adjusted values are indicated with an arrow. The system may be configured, wherein a distance diagnosis is available with a related expert in such a way that the thusly analyzed result is transferred in real time via the distant diagnosis network 230.

Namely, the operation by the operator may be trained and evaluated in such a way to compare the target value that the operator or manager has set with the actual operation value. For example, the set target value (it is preferred that the target value is inputted with a range of an upper limit and a lower limit) and the real time operation value are stored in the integrated DB 221, and the operation type analysis program 222 compares the operation value which is inputted in real time with the previously set target value, thus determining the normal (the target value range is satisfied), the exceeding (higher than the target value), and the decrease (lower than the target value), and a result thereof is displayed with a color and arrow, etc.

Figure 11:
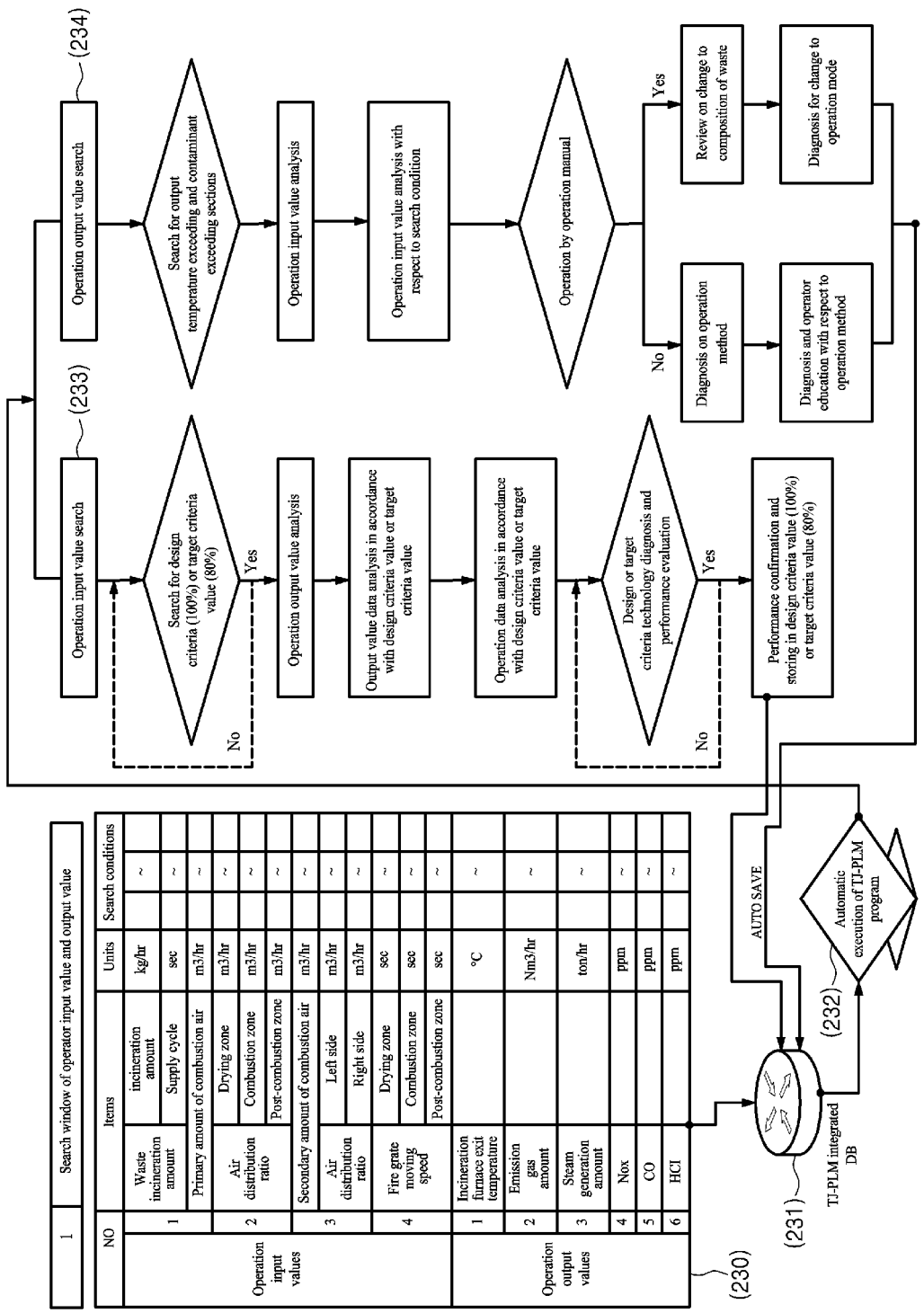
FIG. 11 is a view illustrating an example of a search method based on an incineration facility operation input value and an operation output value and a technology diagnosis and performance evaluation analysis program.

The operation data stored in the integrated DB 221 is formed of a program which needs various search functions and analysis until the service life of the incineration facility ends. As illustrated in FIG. 11, the search range is determined for each item, and there is provided an operator input value and output value input window 230 to input the input value and the output value of the operator, and the search range for each item is set in the operator input value and output value input window 230. It is constituted that when the search condition is inputted, each item or an integrated search can be available. Here, for the sake of search of the operation input value 233, there is provided an algorithm wherein the operation data of the operator is compared and analyzed in preparation for the design criteria value or the operation target criteria value. Here, the analyzed data are automatically stored in the integrated DB 231. When searching the operation output value, there is provided an algorithm wherein the operation range to maintain the most effective facility management and performance is set and inputted into the program, and the section deviating out of the operation range is automatically searched. After a review on the operation method and composition of the wastes is finished, various measures for education, etc. with respect to the change to the operation mode and the operator can be carried out, and the executed and analyzed data can be automatically stored in the integrated DB 231.

The comprehensive efficiency analysis of the conventional incineration facility is calculated by "the waste process efficiency (the actual incineration amount/the design incineration amount)×the driving efficiency (the actual driving time/the target driving time)". In this method, the portion on the LCC management of the facility and the waste heat recovery is omitted, so it is actually hard to determine the comprehensive combustion efficiency.

Figure 12:
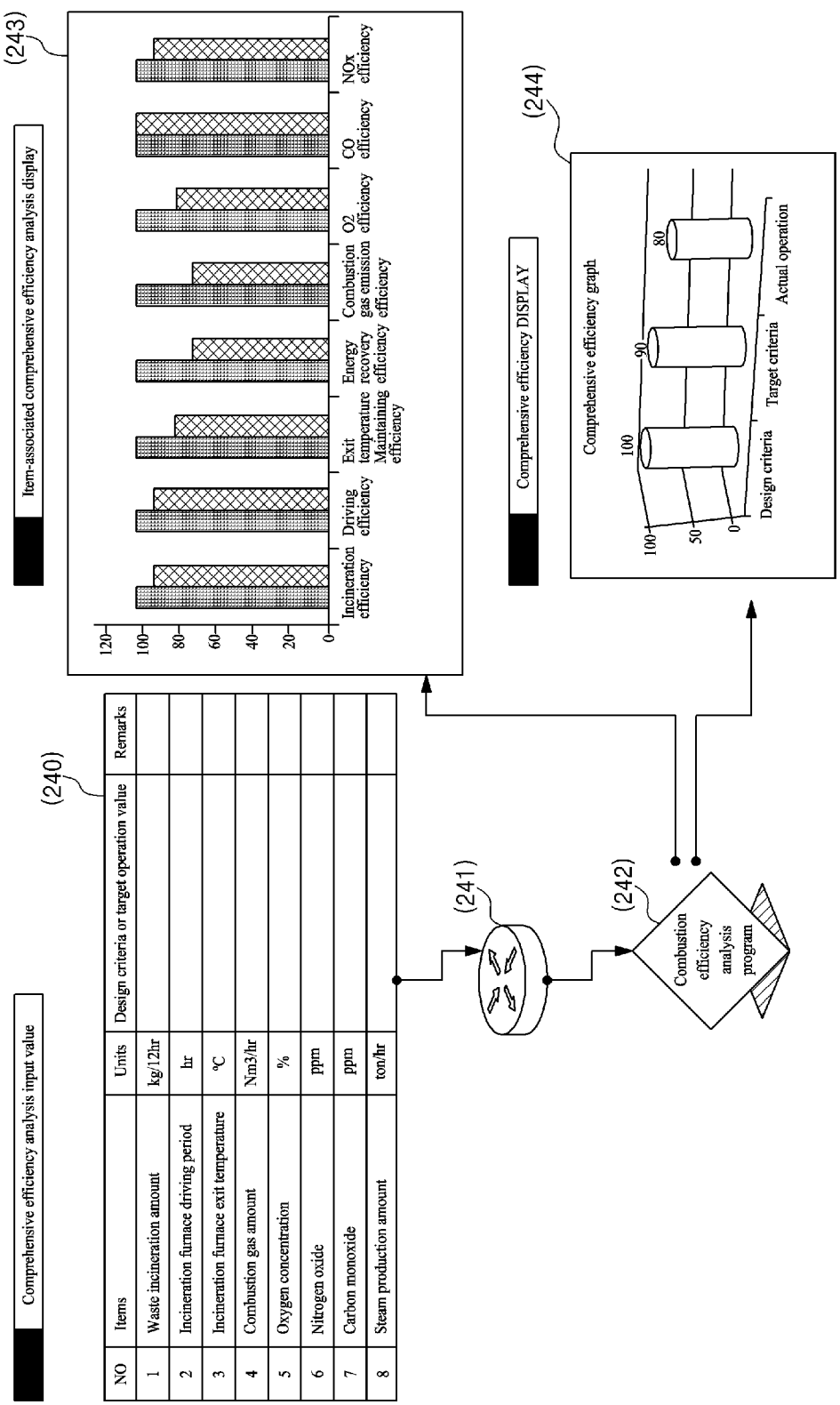
FIG. 12 is a view illustrating an example of an incineration facility item-associated efficiency and a total operation efficiency automatic analysis program.

As illustrated in FIG. 12, the comprehensive efficiency analysis input window 240 is formed. When the design criteria or the target operation value is inputted in the input window 240, the combustion efficiency analysis program 242 automatically generates the item-based comprehensive efficiency analysis graph 243 using the data stored in the integrated DB 241 based on the thusly inputted values.

Finally, the graph 244 is outputted, wherein the comprehensive efficiency analysis is compared and analyzed based on the design criteria, the target criteria, and the actual operation criteria. The graph 244 may be analyzed in real time for each individual and group and is implemented in the form of the web, so a function is added, wherein the graph can be transmitted in real time to the cellular phone of the manager or the CEO.

3. The third chapter: the operation control which uses an operation data of an integrated DB and a secondary amount of combustion air and automatic flow rate adjusting system.

Since the operation condition in the combustion chamber changes as compared with the initial design criteria value due to the wastes having various natures and states, the operator needs to cope with in accordance with an operation situation, but even when the wastes which are different from the design wastes are inputted, there actually is not any change to the operation of the operator (an operation change based on the wastes is impossible in the conventional technology). For this reason, the combustion efficiency lowers, and the service life of the facility may be shortened.

Figure 13:
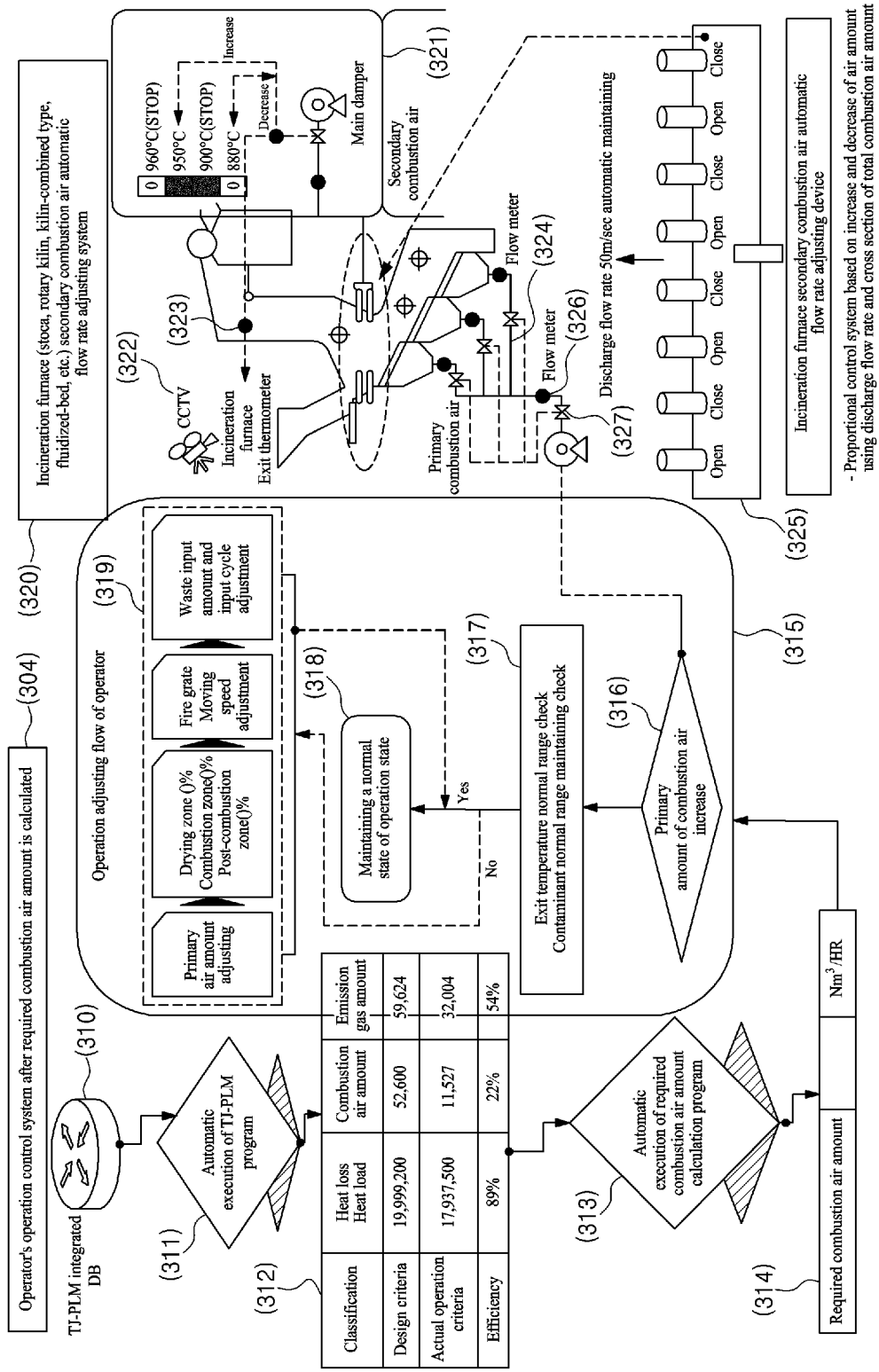
FIG. 13 is a view illustrating an operation range adjusting value feedback operation control system after a supply-necessary (lack) combustion air amount calculation program in an incineration facility combustion chamber and an incineration furnace secondary combustion air automatic flow rate adjusting system are installed.

As illustrated in FIG. 13, the required combustion air amount is calculated in cooperation with the secondary amount of combustion air in the incineration furnace, the automatic flow rate adjusting system 320 and the required combustion air amount calculation program 33 (refer to FIG. 14), and the operation control system 304 of the operator may be constituted using the secondary amount of combustion air and automatic flow rate adjusting system 320.

First, the secondary amount of combustion air of the incineration furnace and the automatic flow rate adjusting system 320 may include a damper which is installed at a secondary combustion air nozzle 325, and a flow meter which is engaged at the duct of the previous terminal of the secondary combustion air blower so as to measure the flow amount of the combustion air. When the exit temperature range of the incineration furnace is set, and an exit thermometer 323 of the incineration furnace, the flow meter 326 and the adjusting damper 327 are cooperated, the secondary air blower combustion air amount may decrease or increase in cooperation with the exit temperature of the incineration furnace. At this time, in the above device, if the decreasing or increasing combustion air amount and the cross section of the secondary combustion air nozzle are previously inputted in the program, the damper may open and be closed in proportion to the input combustion air amount, so the flow rate at the end of the nozzle can be maintained constant.

Various ranges of the incineration furnace exit temperature are stored in the integrated DB, and the driving of the flow meter 326 and the adjusting damper 327 are previously stored so as to respond to the combustion air amount based on the exit temperature range of the incineration furnace, thus automatically controlling the amount of combustion air.

Figure 14:
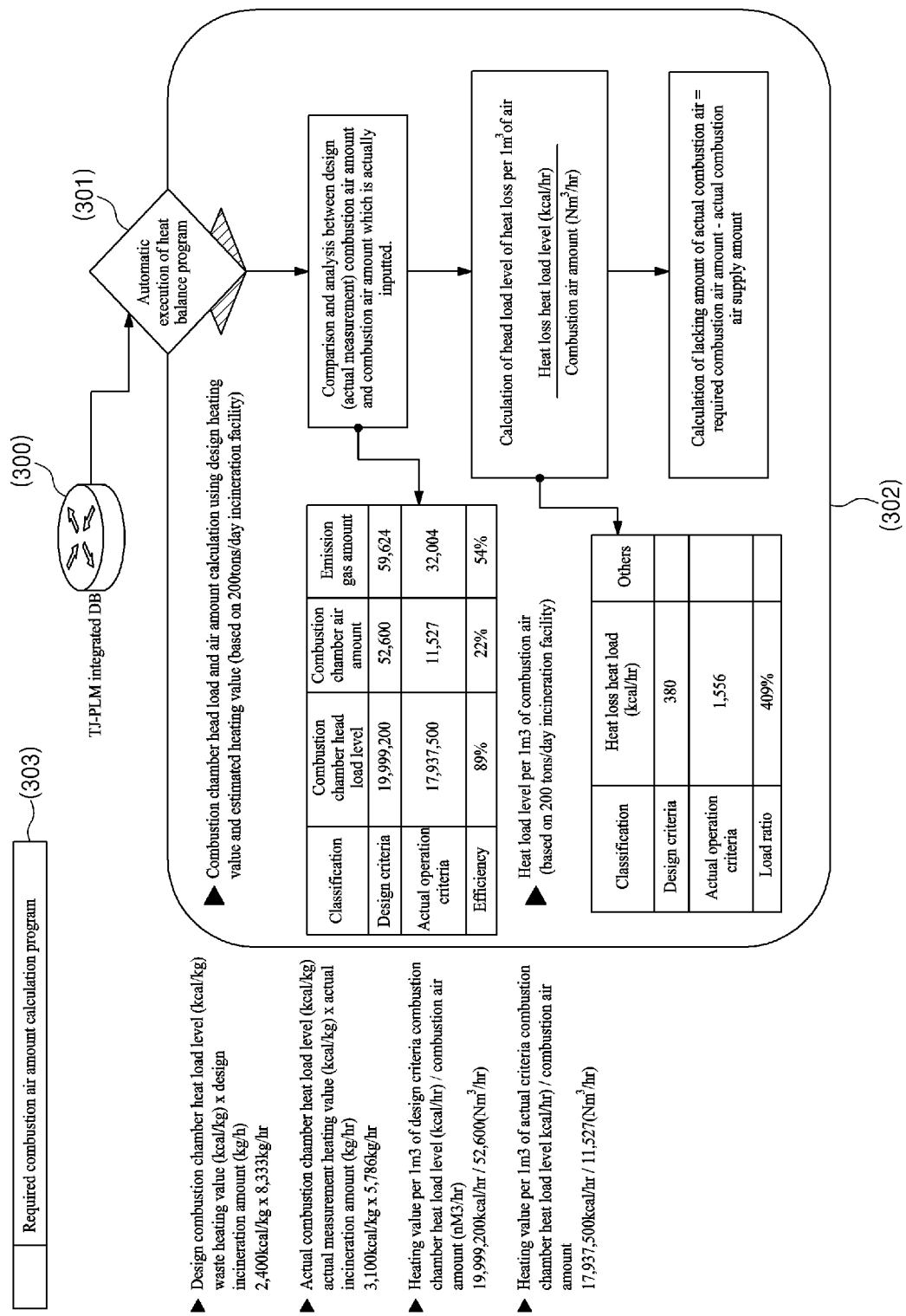
FIG. 14 is a view illustrating an example of a necessary combustion air amount calculation program.

In order to calculate the primary amount of combustion air, as illustrated in FIG. 14, when the heat balance program 301 is automatically executed based on the data in the integrated DB 310, the required combustion air amount 314 can be automatically calculated with the required combustion air amount calculation program 313 using the algorithm 301 configured to calculate the actual combustion air lack amount.

The calculated primary combustion air required amount 314 is a theoretical value which should be inputted into the combustion chamber in the incineration furnace which is currently being operated. It should be supplied by gradually increasing in consideration of the combustion state, thus maintaining a stable combustion condition inside the combustion chamber. To this end, there may be provided an algorithm 315 wherein if the operator recognizes the combustion state in the combustion chamber and increases the primary air amount to a predetermined amount range (within 10%), the normal operation state in the combustion chamber is analyzed, thus automatically managing the adjusting range. At this time, the most effective operation range (the exit temperature, the contaminant, etc.) is set, and the combustion air amount 316 is automatically and gradually increased. When the operation is carried out in the normal operation state, the primary amount of combustion air is increased, and on the contrary, if the normal operation state is not maintained when the primary amount of combustion air increases, the normal operation state can be maintained by adjusting another operation range (the waste agitating speed and the waste input amount, etc.: 319). Since the secondary amount of combustion air and the flow rate at the end of the nozzle can be automatically adjusted by the automatic adjusting system 325, a separate measure is not required. For this reason, it is advantageous that the operator can freely cope with any composition of various wastes. The adjusting range which is automatically adjusted and determined, is automatically analyzed and is stored in the integrated DB 310. There is provided a function where the stored data can be searched in real time by the operator or the manager, so it can be used for various purposes when designing, constructing and operating the incineration facility.

4. The fourth chapter: the integrated facility history management via the use of the PLM of the facility.

The incineration facility is a plant facility and may be formed of various facilities (a crane, an induced draft fan, a press fitting air blower, various pumps, a compressor, various control valves, a conveyer, a thermometer, a pressure meter, other auxiliary facilities, etc.). The life cycles of each facility are different, and operation and management methods are different. For this reason, if one facility has a problem, the operating ratios and service life of the whole facility may be affected due to their characteristics. Due to this characteristic, the whole PLM of the incineration and solid fuel boiler in general is 20~30 years, but there may be a deviation (use period) of 5~10 years according to the plant operation method and each facility management method. In particular, the operation of the operator of the incineration facility and the facility management method may have effect on the service life of the facility, so it needs to carry out the integrated facility history management by using the PLM of the facility.

Figure 15:
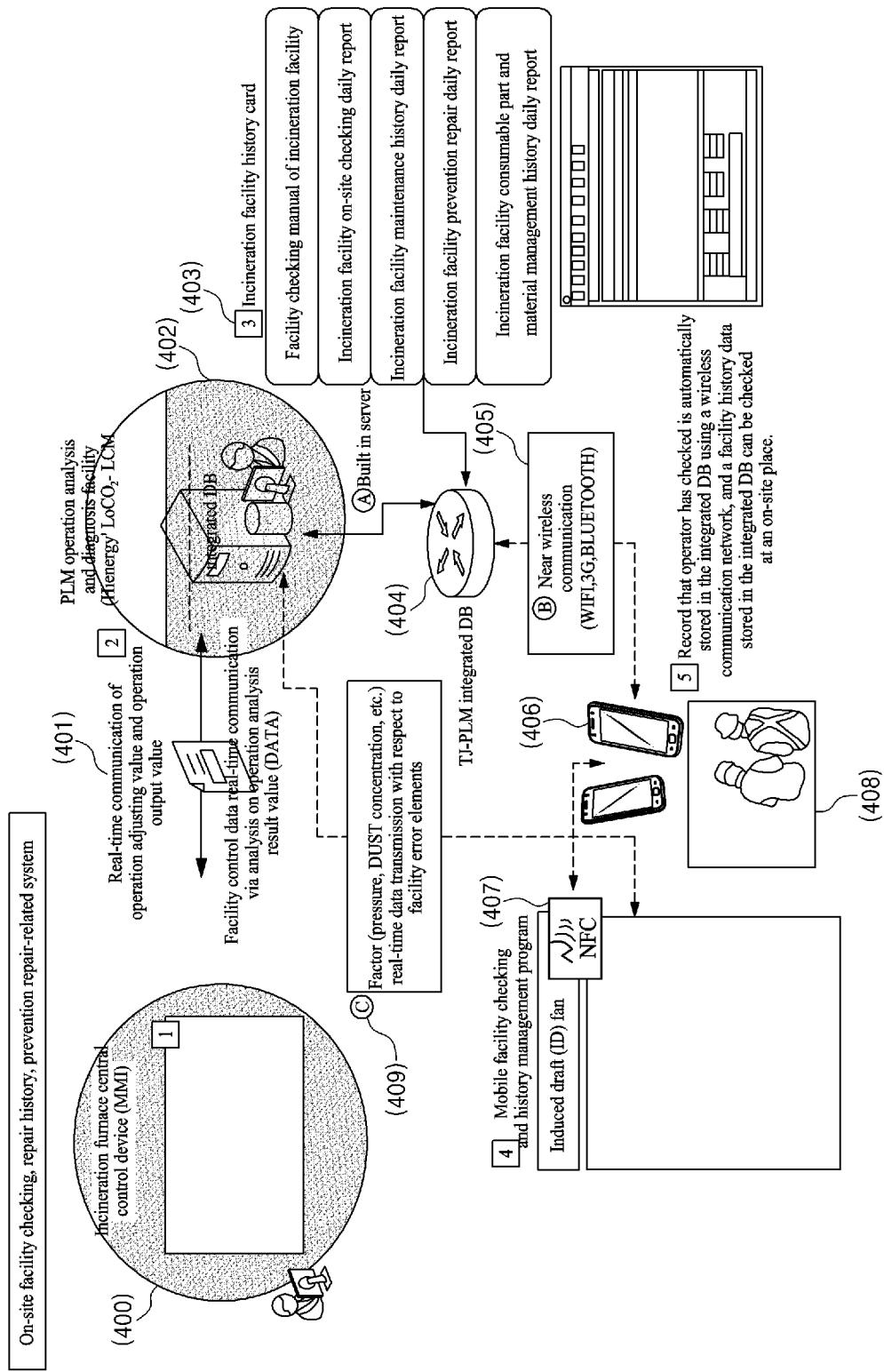
FIG. 15 is a view illustrating an example of an on-site facility automatic checking and PLM system which use an electronic tag (NFC).

As illustrated in FIG. 15, there is provided a system which is able to integrally manage the on-site facility checking, the facility repair history management, the prevention checking, the consumable item management, and the operation manual management by using the electronic tag (NFC: 407) storing the information on the facility provided in the incineration facility and attached to the facility; a portable terminal 406; a near wireless communication network 405; an integrated DB 404 and a server.

An incineration facility history card 403 is written and equipped in the integrated DB 404, and the electronic tag (NFC: 407) is attached to the on-site facility (induced draft fan, etc.), and a check list is made by recording the items that the operator should check on site on the portable terminal 406 using the near wireless communication network 405, and the recorded values are automatically inputted into the incineration facility history card 403, and the data are automatically stored in the integrated DB 404.

In all the incineration facilities (the induced draft fan, etc.), the same information as the information stored in the incineration facility history card 403 of the integrated DB 404 are stored in the electronic tag type.

It may be formed with a system which operates in cooperation with the operation data generating in the MMI [(Man Machine Interface)] which is the incineration furnace operation control device and is shared with the data stored in the integrated DB 404 and is feedback.

Each of all the facilities used in the incineration facility has an incineration facility history card 403 which will be filled out.

The incineration facility history card 403 may be formed of a facility checking manual of an incineration facility; an incineration facility on-site checking daily report; an incineration facility repair history daily report; an incineration facility prevention repair daily report; an incineration facility consumable item and a material management history daily report.

As illustrated in FIG. 16, the incineration facility history card 410 may provide basic matters, for example, the current status of the facility, the installation company, etc. (the name of the facility, the name of the item, the total quantity, the title of the unit, a written date, the managing department, a person in charge of the management, an installation date and period, the position of the installation, an information on the delivery (installation) company, an information on a manufacturing company, an installation cost, a durability year, a part exchange cycle of a consumable item, etc.).

For the sake of systematic management and repair of the facility, for example, to the lower side of the incineration facility history card 410, the sheet of each of the checking record 411, the facility repair history 412, the prevention repair and consumable item management facility management criteria 413 may be linked. If each link selected, it is programmed so that each link moves to the sheet.

Figure 17:
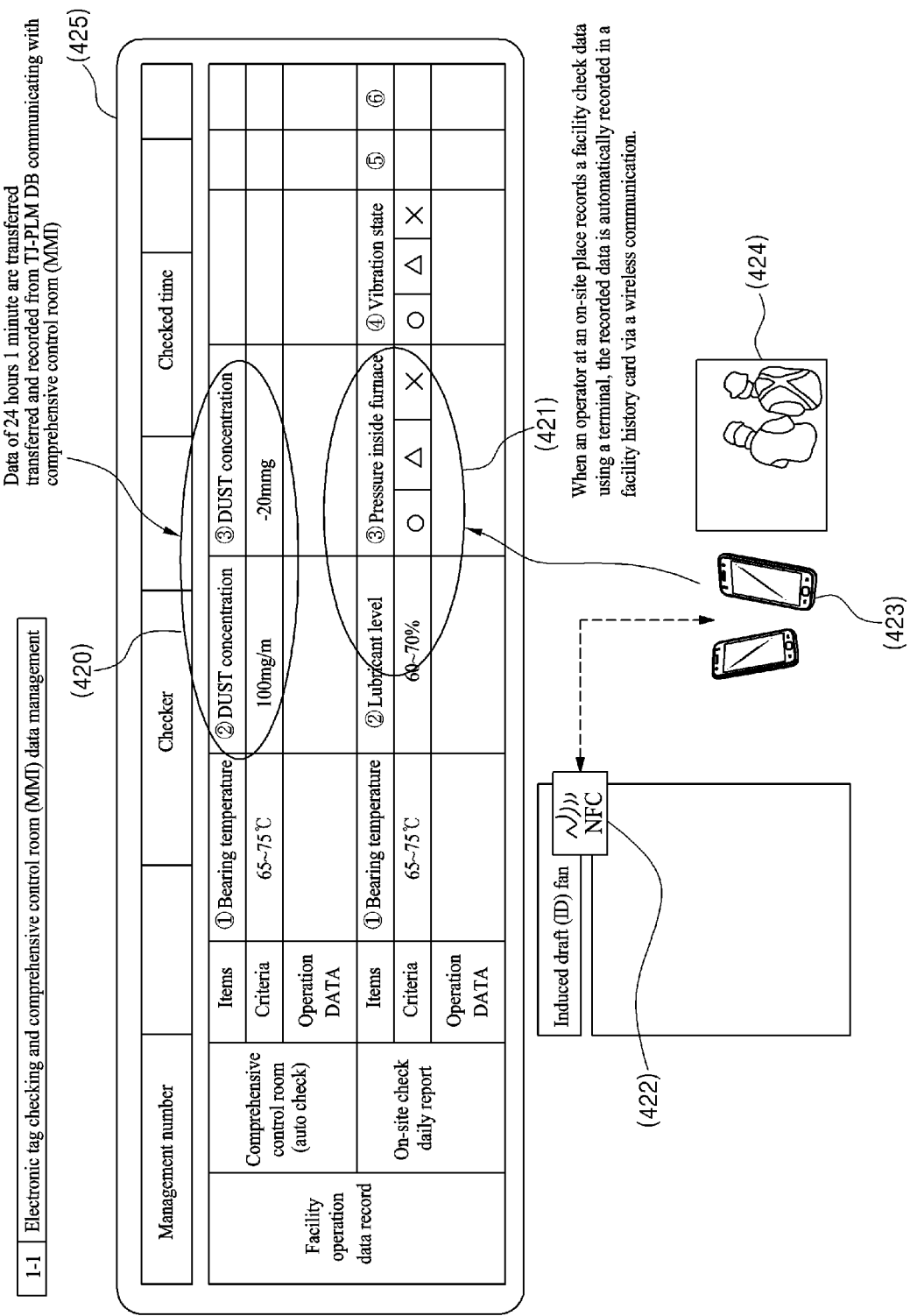

FIG. 17 is a view illustrating an example of the facility checking management history table 425 which may be extracted in accordance with the selection of the sheet of the checking record 411.

The facility checking management history table 425 records the sensor values detected by the local sensor of the on-site facility and the values of the automatic sensor.

In case of the incineration facility, two kinds of sensors should be installed at the on-site facility, one of which is an automatic sensor (a digital type) which allows the operator to check via the central control device 400 (the comprehensive monitoring control chamber), and the other one of which is a local sensor (an analog type) which allows the operator to confirm at an on-site place.

The sensing value detected by the automatic sensor (a digital type) is automatically transmitted to the central control device, and the sensing value of the local sensor (an analog type) is a direct confirmation checking value that the operator manually writes down with hands at the on-site place.

Here, in order to monitor any error in the automatic sensor or an error value in the measurement, the local sensor (an analog type) should be installed near the automatic sensor so as to manually measure the sensor value. According to an ordinary operation method, the operator visits in person the on-site place 3~4 times a day and records the local sensor (an analog type).

As illustrated in FIG. 17, it is constituted that on the upper side of the facility checking management history table 425, the information(a management number, a checker, a checking time) of the operator written when forming the operator shift group is automatically inputted, whereupon the clear records on the checking state of the on-site facility can be automatically stored and sorted out. In the past, since the operator manually must have written down with hands, the cause analysis, etc. was indefinite when error occurred at the facility, and it was hard to efficiently manage the facility. In the present invention, the transparency with respect to the on-site facility checking by the operator can be obtained, thus efficiently managing the facility.

On the facility checking management history table 425, it is possible to concurrently display and compare the automatic sensor value (a digital type) which can be confirmed by the central control device 400 when operating the incineration facility and the local sensor (an analog type) value that the operator conforms in person and inputs at the on-site place, so the failure and error in various sensors and the error presence in the on-site facility can be accurately checked and managed, whereby an efficient facility management is available.

The sensor value (the value detected by the operating sensor of the incineration furnace) of the on-site facility is stored at every one minute in the MMI [(Man Machine Interface) 400], and the data are automatically inputted and managed 420 in the facility checking history table 425. The checking record data (3~4 times in general are checked a day) recorded using the portable terminal 423 that the operator has checked on the lower side using the electronic tag 422 at the on-site plate in cooperation with the above values are automatically recorded and compared and analyzed. If the checking management value of the on-site facility exceeds a predetermined range, an alarm may be automatically generated, so that the operator can check any error occurrence at the facility.

When the sheet of the facility repair history 412 is selected in the incineration facility history card 410, the repair construction history management table 430, for example, in the type as in FIG. 18, can be extracted.

Generally, in case of the incineration facility, there is a lot of occasion where the initial design criteria value and the operation manual change due to various natures and states and heating values of the wastes. For this reason, three occasions [a cause in the design, a cause in the construction, and a cause in the operation (432)] may be sorted out in order to analyze the causes when errors occurs in the facility due to such changes. In order to analyze such three causes, it needs to provide a system which may allow to confirm the continuous data with respect to the operation type of the operator and the checking management. Namely, the present invention may allow to obtain the operation type and the data of the checking management from the data obtained at every one minute through the MMI and from the data obtained through the on-site checking.

As illustrated in FIG. 18, in preparation for any error in the facility, the facility error cause analysis and repair construction history management table 430 has a basic data which may be used to analyze the cause of the error by automatically searching the check exceeding range in the normal section, the checking state by the checker, and the exceeding of the data linked to the MMI (Man Machine Interface) 400.

Figure 6:
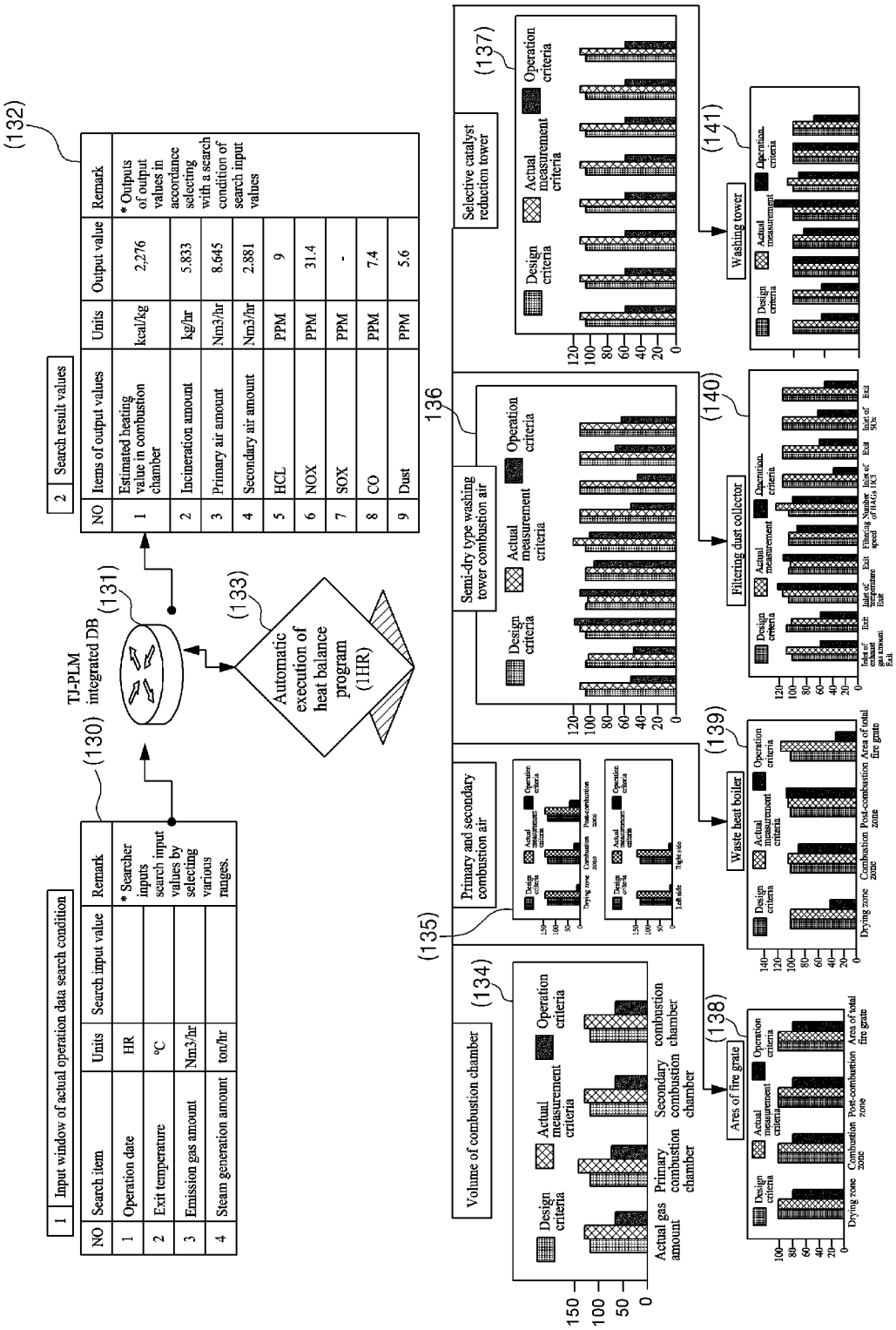
FIG. 6 is a view illustrating an example of an incineration furnace and a prevention facility capacity analysis program using an actual operation data.
Figure 7:
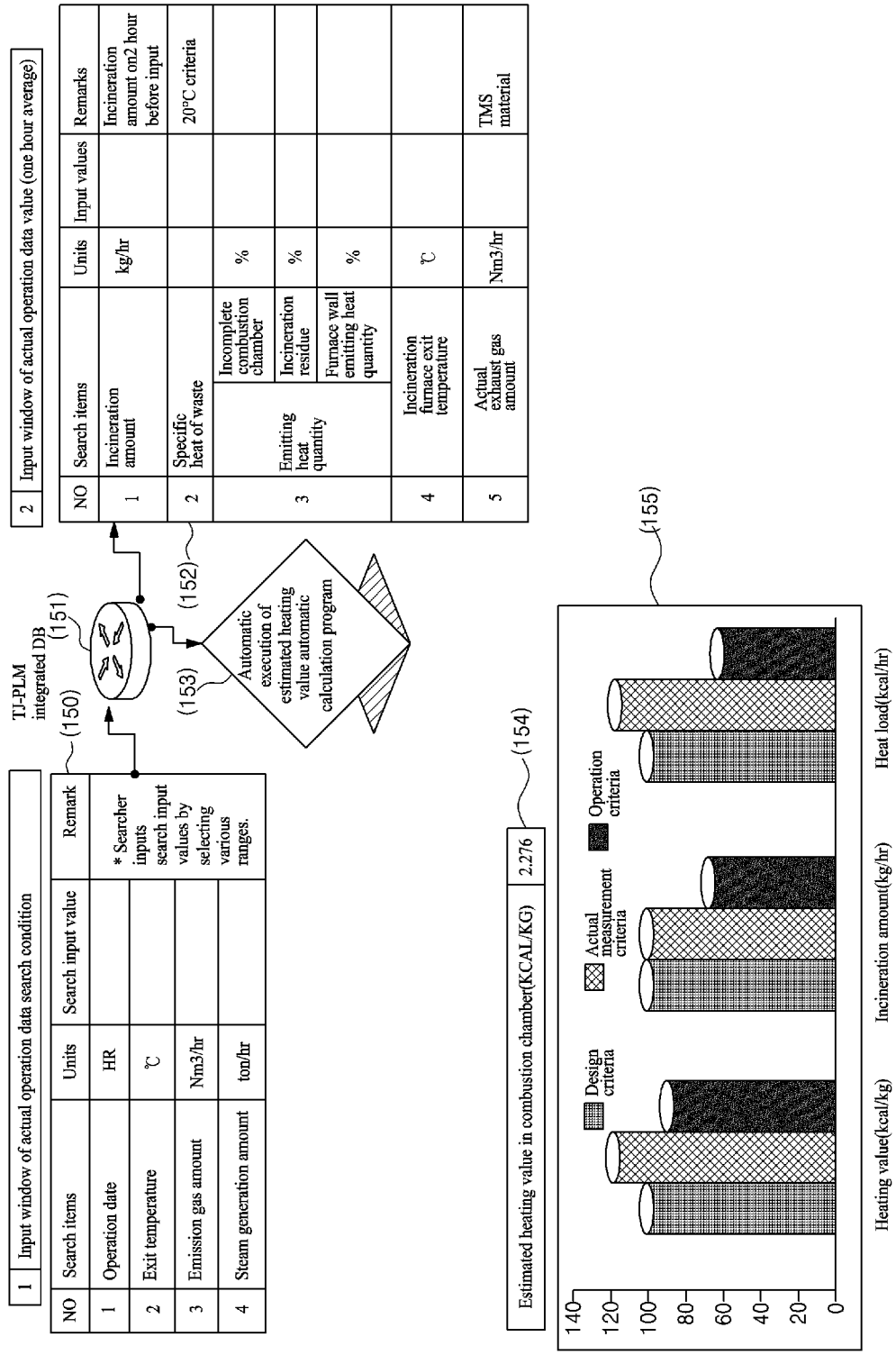
FIG. 7 is a view illustrating an example of an incineration furnace (the incineration boiler, the solid fuel exclusive boiler) estimated heating value automatic calculation and analysis program wherein an initial design value and an measured actual value are compared and analyzed using an actual operation value as an actual operation data value.

The data on the operation-associated cause which has been automatically analyzed is compared with the facility management and operation manual 450 in FIG. 6 wherein the information on the design and construction of the facility have been recorded via the consultation with the incineration facility-related expert through the distant network on the web, and the error causes of the facility may be sorted into three causes [(a design, a construction, an operation: 432)] and are automatically recorded and managed as the facility history.

The cost and value are analyzed using the known value evaluation in terms of the lifecycle with respect to each facility and the economic analysis program [VE/LCC program] 433 and are recorded and stored. The thusly recorded and stored data will be recorded until the destruction time where the lifecycle is finished.

The thusly recorded and analyzed data may be used as a design material when newly installing the facility by analyzing the economic feasibility with respect to the cost and convenience from the initial installation to the destruction of the facility.

Generally speaking, the consumable part exchange of the incineration facility and the prevention repair are checked and managed based on the manual provided by the facility company. There is a lot of occasion where the operation manual provided from the company is not adapted due to the change to the incineration facility when errors frequently occur due to the characteristic of the incineration facility and the inputs of the wastes having various natures and states. In the present invention, when the sheet of the prevention repair and consumable part management 414 is selected from the incineration facility history card 410 in consideration of any special characteristic of the incineration facility, the prevention repair and consumable part management table 440 of the facility in the type in FIG. 19 can be displayed.

The prevention repair and consumable part management table 440 of the facility may be configured to provide the data on the name of the consumable part, the consumable part management history, the exchange cycle, the actual exchange date, the exchange history, the automatic alarm function, etc., and the electronic tag 441 containing the above data is attached to each consumable part.

Meanwhile, an automatic alarm function may be added for the sake of quick repair and management of the incineration facility. The checking date and exchange date of each incineration facility and consumable part stored in the integrated DB 404 may be managed by the program of the server. The server may guide the checking and exchange by transmitting a text message, etc. to the portable terminal 442 on the checking date and the exchange date of the incineration facility and the consumable part.

Figure 20:
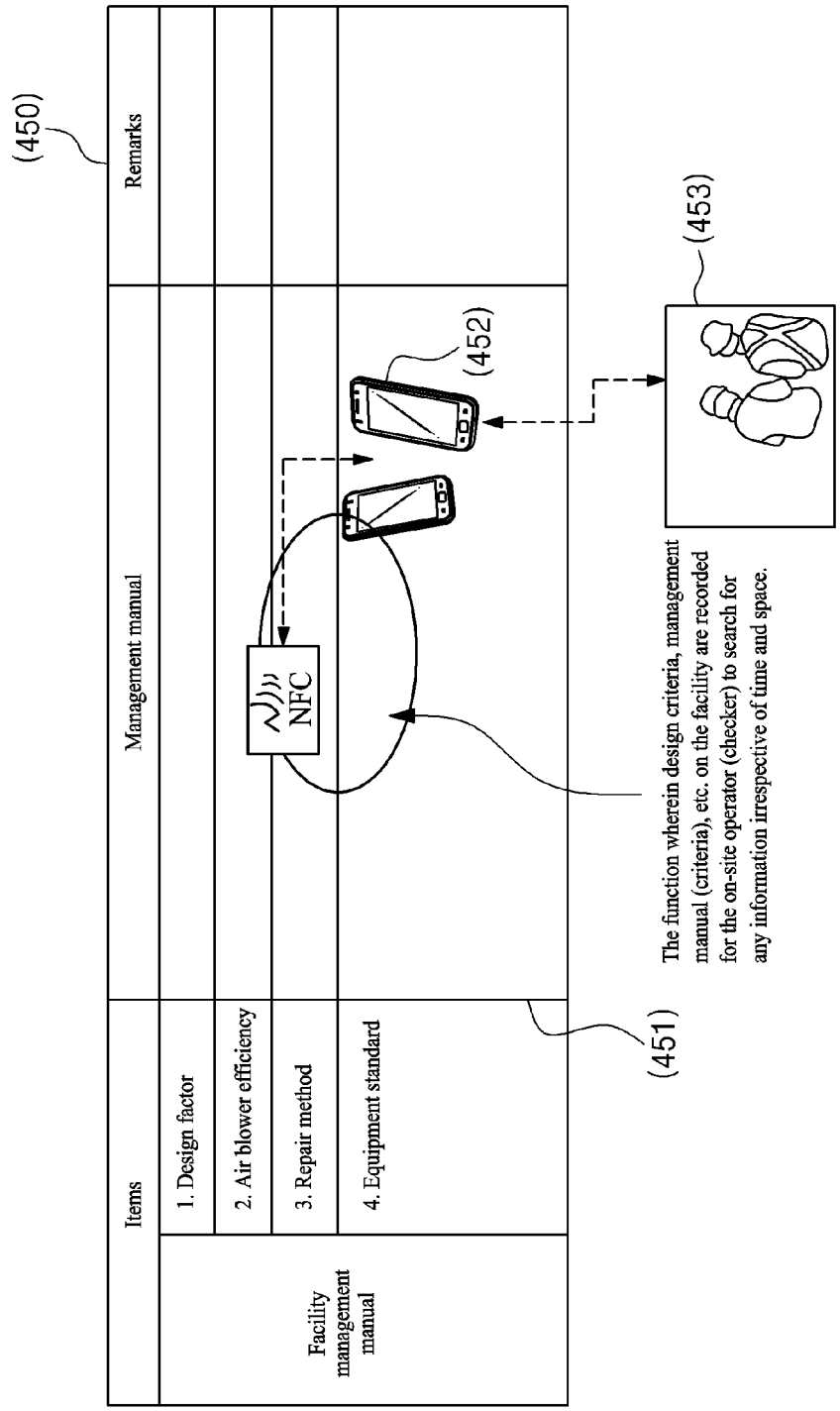

As illustrated in FIG. 20, the manual on the design, construction, operation and repairing method may be arranged and stored in the facility management and operation manual table 450 of each facility equipped in the integrated DB 404, so the operator 453 may receive various information stored in the integrated DB 404 using the portable terminal 452 during the on-site checking, thus efficiently managing the facility.

5. The fifth chapter: Carbon dioxide calculation and reduction management in the incineration facility.

The greenhouse gas discharged from the incineration facility may be categorized into $CO_2$ indirect emission amount, for example, an electricity use amount, an assistant fuel use amount, various chemical use amounts, etc. which are necessary for the driving of the facility, and a direct emission amount which generates due to the incineration of wastes.

Figure 21:
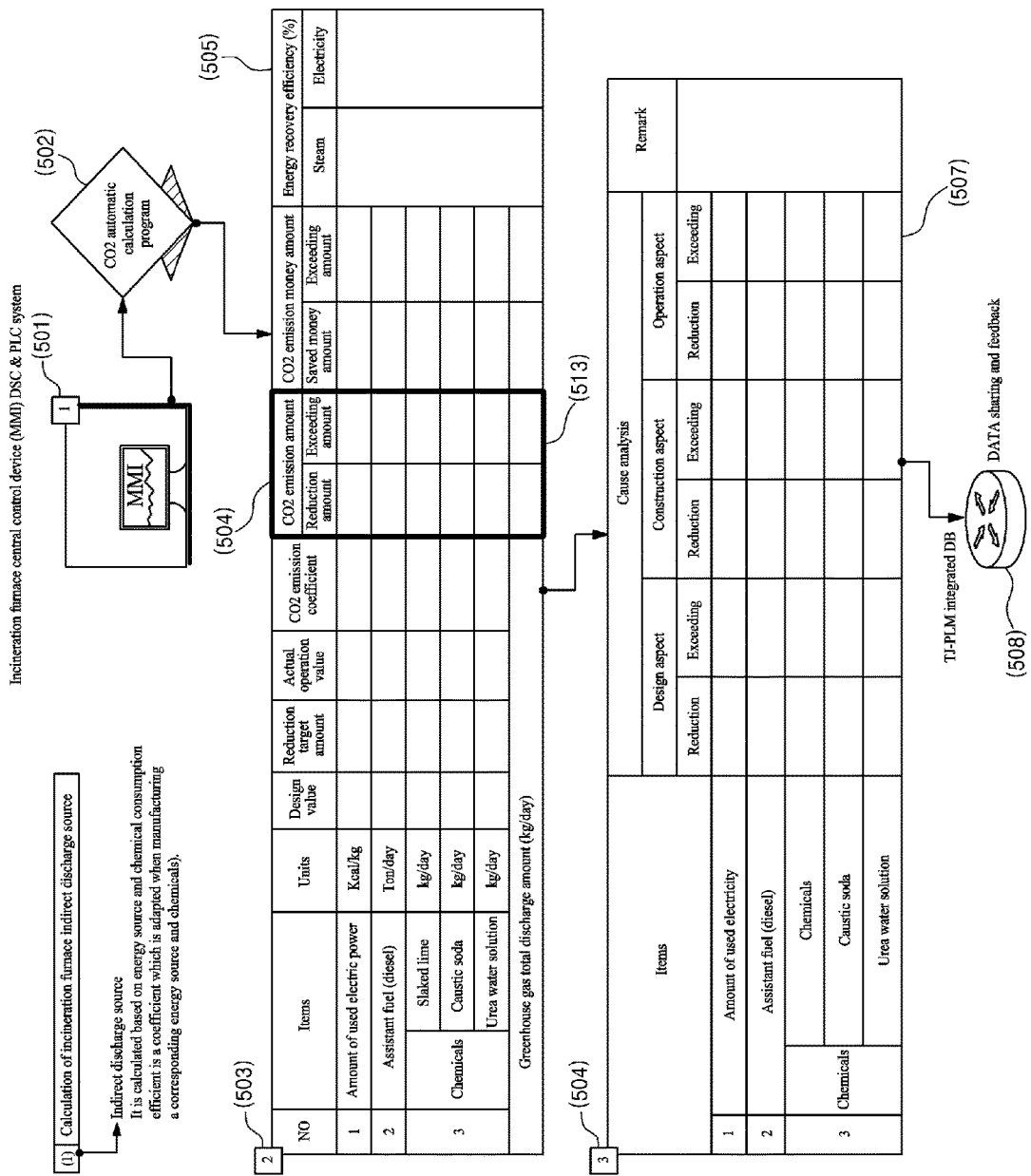
FIG. 21 is a view illustrating an example of an indirect emission carbon dioxide management program of an incineration facility

FIG. 21 is a table illustrating an example of the calculation of the indirect emission amount. As seen in the table 503 on a result of the operation that the operator has operated in the MMI [(Man Machine Interface)] 501, the values may be calculated using a known automatic calculation program 502 by using the $CO_2$ emission coefficient corresponding to each item based on a design value with respect to each item, a reduction target amount, and an actual use amount. For the calculation criteria with respect to the reduction amount and exceeding amount of the $CO_2$ emission amount, it is calculated by compensating the energy recovery efficiency (the design criteria amount/the actual generation amount: 505) of the incineration facility. In the form of the table 506, the cause analysis 507 [the cause analysis is based on the analysis by the expert consultant and related expert (engineering technician) based on the calculation formula] on the reduction and exceeding of the $CO_2$ emission amount is sorted out and analyzed in terms of designs, constructions and operations. The analyzed result is automatically stored in the integrated DB 508.

The total amount of $CO_2$ discharged from a chimney due to the incineration of wastes which is the greenhouse gas direct emission source may be calculated based on $CO_2$ emission coefficient.

Figure 22:
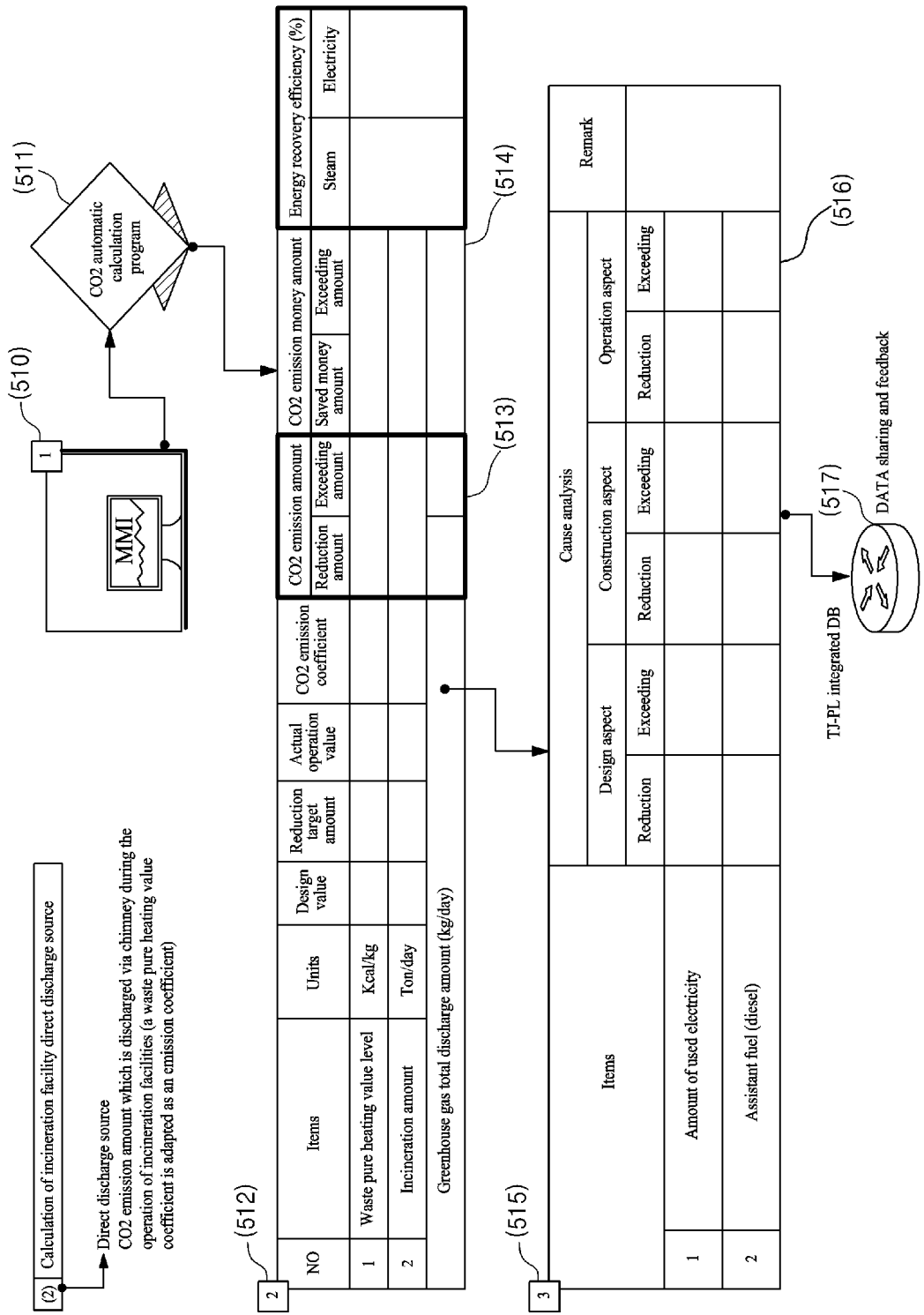
FIG. 22 is a view illustrating an example of a direct emission carbon dioxide management program of an incineration facility.
Figure 23:
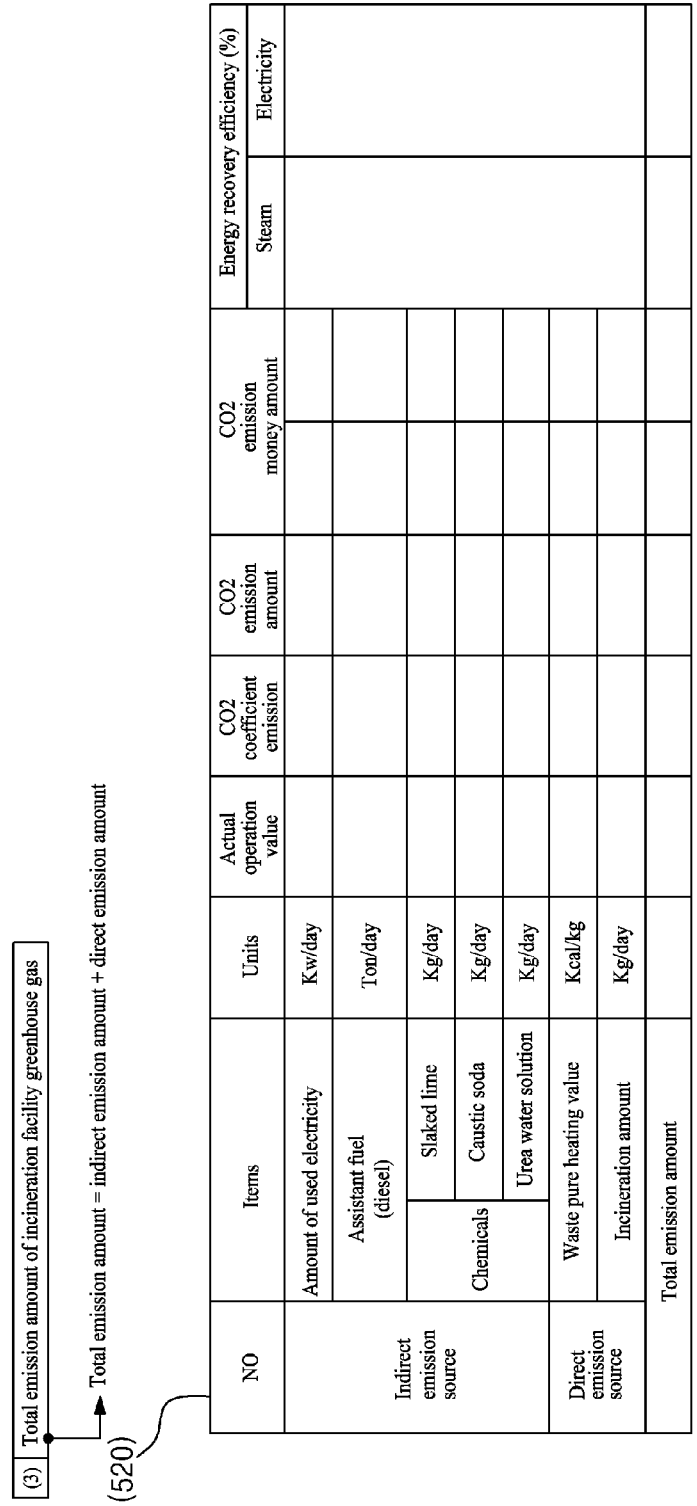
FIG. 23 is a view illustrating an example of a result of the total emission amount calculation of a greenhouse gas.

The result that the operator has operated on the MMI 501 (Ma Machine Interface) may be calculated with an automatic calculation program 511 by adapting $CO_2$ emission coefficient corresponding to the pure heating value of the wasters based on the design value, the reduction target amount and the actual operation value with respect to each item like in the table 512 (refer to FIG. 22) via the integrated DB 508. Here, as the calculation criteria with respect to the reduction amount and exceeding amount of $CO_2$ emission coefficient, it is calculated by compensating the energy recovery efficiency (the design criteria amount/the actual generation amount: 514) of the incineration facility. In the table 515, the cause analysis 516 with respect to the reduction and exceeding of the $CO_2$ emission amount may be sorted out and analyzed in terms of designs, constructions and operations, and the analyzed result is automatically stored in the integrated DB 517. To this end, the total emission amount of the greenhouse gas, as seen the table 520 in FIG. 23, may be calculated by summing the indirect emission amount and the direct emission amount in the incineration facility.

As described above, in the present invention, the incineration furnace (the incineration boiler, the solid fuel boiler) diagnosis via the operation type analysis of the heat budget (Heatbalance)/the incineration furnace operation source, the control, the distant diagnosis and the PLM and the operation efficiency program may be formed of five programs. They may have function as each program, and the present program developed on the web as an integrated data management system wherein the first to fifth chapters may organically share the data and feedback while providing a function as each program, may have a function wherein a technology diagnosis is distantly available using the internet network.

The invention claimed is:

1. A method for diagnosing and controlling an incineration facility and solid fuel boiler and managing the life cycle of a facility through a heat exchange and a design program and an operation mode analysis of an operator, comprising:
    a first step wherein an operation value of an incineration facility is stored in a database, which includes a primary amount of combustion air, a secondary amount of combustion air, a fire grate moving speed, a temperature, an emission gas amount, and a steam amount which are all detected at every predetermined time interval by an incineration furnace operating sensor and provided via a MMI (Man Machine Interface) and are all outputted during the operation by an operator, and a design value (a) based on the design of the incineration facility calculated via a heat balance and design program, and an measured actual value (b) based on the operation of the incineration facility constructed in accordance with the design are inputted in a database at the same time interval as the operation value; and a second step wherein the design value, the measured actual value and the operation value are extracted by a server based on the data stored in a database in the first step, and data are extracted in the form of a graph and a table wherein the operation value, the design value and the measured actual value can be comparable, wherein in the first step, a target value of the operator is set and stored by the database, and in the second step, the target value and the operation value set in the first step through the server are compared, and a result of the target achievement of the operation value is extracted, and wherein in the second step, among the values detected by the incineration facility operating sensor, a current detection value generating by the operation of the operator and the just previous detection value are compared, and if the current detection value is different from a just previous detection value, it is determined as an operation by the operator, thus extracting the operation time of the operator.

2. The method of claim 1, wherein in the second step, the target value and the operation value are compared, and a normal section, a target exceeding section and a target decreasing section are categorized thereby and extracted.

3. The method of claim 1, wherein in the second step, the target value and the operation value are compared, and the a normal section, the target exceeding section and a target decreasing section are accumulated at every predetermined time interval and extracted.

4. The method of claim 1, wherein in the second step, a carbon dioxide emission amount is calculated based on the design value, the measured actual value and the operation value via a known carbon dioxide emission amount calculation program, and then the related data are extracted.

5. The method of claim 1, wherein in the first step, the input values of the operator and a manager are stored, and in the second step, an output value based on the input value is searched from the database and is extracted.

6. The method of claim 1, wherein in the second step, a required combustion air amount in a combustion chamber is automatically calculated using a design heating value and an estimated heating value, and the opening of a main damper of a secondary combustion air blower is adjusted based on the calculated required combustion air amount.

* * * * *